US012737150B2

(12) United States Patent
Thirumaleshwara et al.

(10) Patent No.: US 12,737,150 B2
(45) Date of Patent: Sep. 15, 2026

(54) DYNAMIC AUDIO ROUTING OVER A NETWORK BUS

(71) Applicant: Analog Devices International Unlimited Company, Limerick (IE)

(72) Inventors: Prasanna Baja Thirumaleshwara, Kasargod (IN); Gaurav Jain, Bangalore (IN); Gaurav Shekhar, Hyderabad (IN)

(73) Assignee: Analog Devices International Unlimited Company, Limerick (IE)

( * ) Notice: Subject to any disclaimer, the term of this patent is extended or adjusted under 35 U.S.C. 154(b) by 291 days.

(21) Appl. No.: 18/661,364

(22) Filed: May 10, 2024

(65) Prior Publication Data

US 2024/0378011 A1 Nov. 14, 2024

(30) Foreign Application Priority Data

May 12, 2023 (IN) ............................ 202341033501

(51) Int. Cl.
*G06F 3/16* (2006.01)

(52) U.S. Cl.
CPC .............. *G06F 3/162* (2013.01); *G06F 3/165* (2013.01)

(58) Field of Classification Search
CPC ................................ G06F 3/162; G06F 3/165
See application file for complete search history.

(56) References Cited

U.S. PATENT DOCUMENTS 9,913,034 B2 * 3/2018 Arknaes-Pedersen ... H04R 3/12

* cited by examiner

*Primary Examiner* — Carolyn R Edwards
*Assistant Examiner* — Dylan Maguire Neece
(74) *Attorney, Agent, or Firm* — ArentFox Schiff LLP

(57) ABSTRACT

In a network host discovers each node n and each audio group at each node, an audio group including audio channel(s) and being one of a source or a sink. The host receives identification of at least one audio stream having a source audio group and sink audio group(s). The host derives, for each node n starting from main downstream to a last node: register values DNMaskReg(n) and register values DNSlotReg(n). The host derives, for node n starting from the last node and proceeding to the main node: register values UPMaskReg(n) and UPSlotReg(n). The host derives, for each node n: register values TXCrossReg(n) and RXMaskReg(n). The host writes, over the network to a corresponding register of each node n, the derived register values.

24 Claims, 20 Drawing Sheets

1600

2000

DYNAMIC AUDIO ROUTING OVER A NETWORK BUS

CROSS REFERENCE TO RELATED APPLICATIONS

The present application claims priority to Indian Patent Application Number 202341033501 of the same title and filed on May 12, 2023; and hereby incorporates such application by reference herein in its entirety.

FIELD OF THE DISCLOSURE

This disclosure relates to networking, generally. More specifically, the disclosure describes technology for dynamic audio routing over a network bus.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

Automotive Audio Bus (A2B) is a high bandwidth, bidirectional, digital audio bus. A2B is capable of transporting Inter-Integrated Circuit Sound (I2S) data (both time-division multiplexing (TDM) and pulse density modulation (PDM)) and Inter-Integrated Circuit (I2C) control information, along with clock and power, using a single, 2-wire uni-shield twisted pair (UTP) cable over distances up to 30 m between nodes and 300 m over the entire daisy chain. A2B can be used as its own network with embedded sub-networks, or as an endpoint transport bus used in combination with other, longer distance protocols. The clock is synchronous on all nodes in a single A2B network. Microphone and serial audio data is received on each node in the system simultaneously.

SUMMARY OF THE DISCLOSURE

In some aspects, the technology described herein relates to computer-implemented methods, systems, and computer program products for configuring a network in the context of the network including a host, a main node in communication with the host, an ordered daisy chain of sub nodes in communication with the main node via a bus, and at least one peripheral in communication with each sub node other than via the bus. The bus implements a frame and slot time division multiplexing networking protocol.

In some example embodiments, the technology may include discovering, by the host, each node and each audio group at each node, wherein an audio group includes one or more audio channels and is characterized as one of a source audio group or a sink audio group. The host receives identification of at least one audio stream characterized by a source audio group and at least one sink audio group. The host derives, for each node n starting from the main node and proceeding downstream to a last node: register values DNMaskReg(n) identifying slots associated with each audio stream having a source audio group upstream of node n and a sink audio group at node n, and register values DNSlotReg (n) identifying slots associated with each audio stream having a source audio group upstream of node n. The host derives, for each node n starting from the last node and proceeding upstream to the main node: register values UPMaskReg(n) identifying slots associated with each audio stream having a source audio group downstream of node n and a sink audio group at node n, and register values UPSlotReg(n) identifying slots associated with each audio stream having a source audio group downstream of node n and at least one sink audio group upstream of node n. The host derives, for each node n: register values TXCrossReg (n) mapping each slot passing DNMaskReg(n) or UPMaskReg(n) to a channel of a sink audio group at node n, and register values RXMaskReg(n) mapping each channel of a source audio group at node n to slots passing DNSlotReg(n) or UPSlotReg(n). The host writes, over the network to a corresponding register of each node n, the derived register values. In most cases, there is no specific derivation required for main node, whatever passed up from the first sub node (A) port would be upslot for main node.

In some example embodiments, the technology may include, at each node n, after the writing: receiving, in downstream on the bus, a frame of the network; writing, to a sink audio group frame buffer, each slot of the received frame passing DNMaskReg(n); writing, to a sink audio group pin buffer, each slot of the sink audio group frame according to TXCrossReg(n).

In some example embodiments, the technology may include, at each node n, after the writing: receiving, from a peripheral, channel audio data into a source audio group pin buffer; writing, from the source audio group pin buffer, the received channel audio data to a source audio frame buffer according to RXMaskReg(n); and transmitting, in downstream on the bus in a frame of the network, the received channel audio data written to the source audio frame buffer and passing the DNSlotReg(n).

In some example embodiments, the technology may include, at each node n, after the writing: receiving, in upstream on the bus, a frame of the network; writing, to a sink audio group frame buffer, each slot of the received frame passing UPMaskReg(n); writing, to a sink audio group pin buffer, each slot of the sink audio group frame according to TXCrossReg(n).

In some example embodiments, the technology may include, at each node n receiving, from a peripheral, channel audio data into a source audio group pin buffer; writing, from the source audio group pin buffer, the received channel audio data to a source audio frame buffer according to RXMaskReg(n); and transmitting, in upstream on the bus in a frame of the network, the received channel audio data written to the source audio frame buffer and passing the UPSlotReg(n).

In some example embodiments, the technology may include writing from the host to corresponding register of each node n using one of Serial Peripheral Interface (SPI), an Inter-Integrated Circuit (I2C) interface, an Inter-Integrated Sound (I2S)/Time Division Multiplex (TDM) interface, and any combination thereof In some example embodiments, the technology may include discovering a change in one or more of network topology, audio groups, audio channels, and identification of audio streams; and performing the first deriving, second deriving, third deriving, and writing in accordance with the discovered change.

In some examples, receiving identification of at least one audio stream may include receiving user selection of matrix elements via a graphical user interface (GUI), the matrix characterized by each column representing one source audio group and each row representing one sink audio group.

BRIEF DESCRIPTION OF THE DRAWINGS

The present invention will now be described in more detail with reference to the accompanying drawings, which are not intended to be limiting.

DETAILED DESCRIPTION

Figure 1:
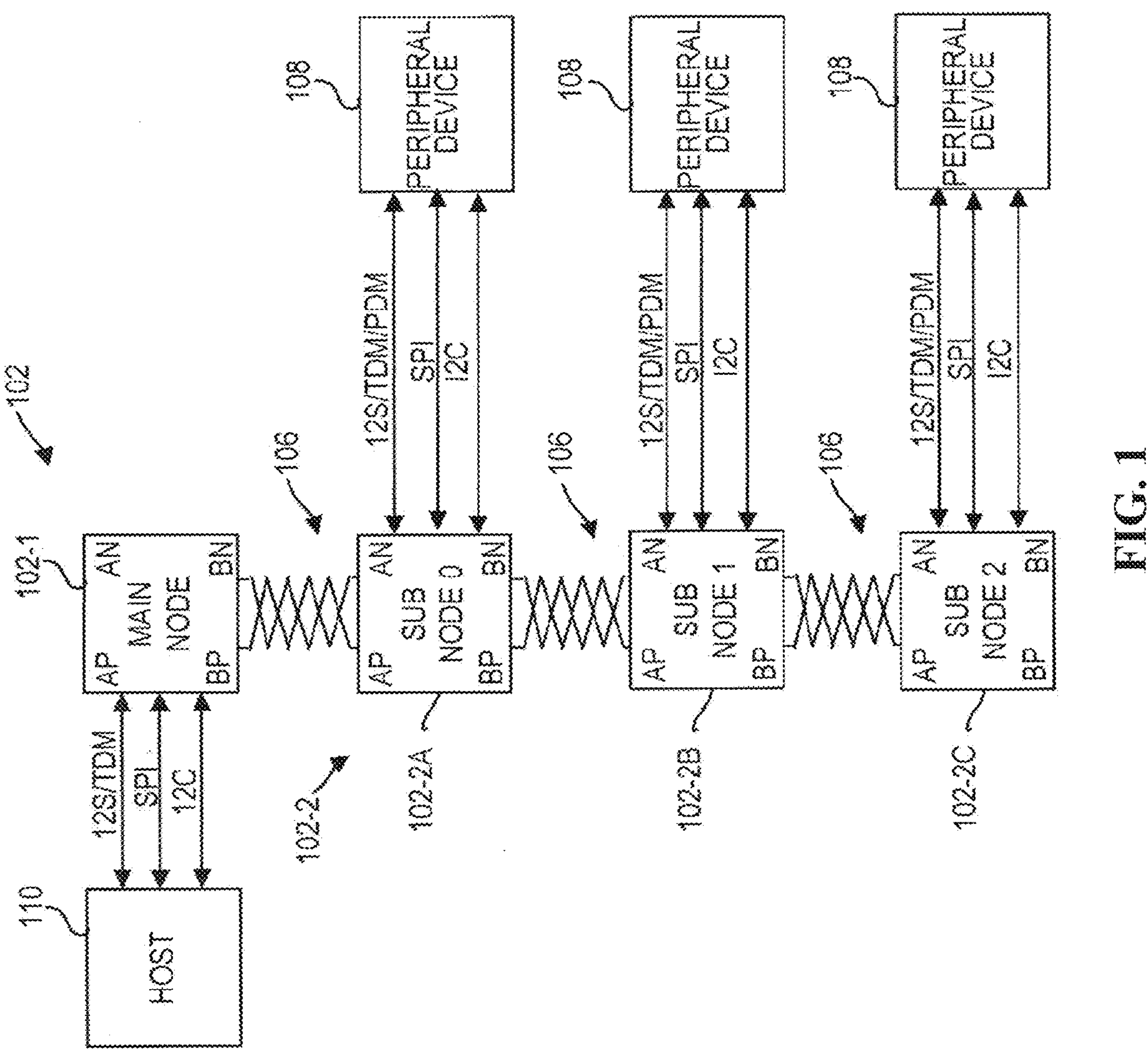
FIG. 1 is a block diagram of an illustrative two-wire communication system, in accordance with examples of the technology disclosed herein.

In the following detailed description, reference is made to the accompanying drawings which form a part hereof wherein like numerals designate like parts throughout, and in which is shown by way of illustration examples that may be practiced. It is to be understood that other examples may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described example. Various additional operations may be performed and/or described operations may be omitted in additional examples.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an example" or "in examples," which may each refer to one or more of the same or different examples. Furthermore, the terms "comprising," "including," "having," and the like, as used with respect to examples of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality.

While A2B technology was initially designed for automotive environments, it may have application in non-automotive environments as well. One challenging use-case may be supporting dynamic audio routing. In typical automotive environments, audio routing may be predefined, e.g., during network design itself the ordering and the capability of A2B nodes in the network is defined. As an example, consider two devices in an automobile—e.g., a speaker and a microphone. In this example, we know that the network design state may be static and that there may be an Audio stream from Mic to Speaker. So, one may derive slot configuration for both MIC and Speaker nodes.

But, for non-automotive use cases, like stage audio and conference room applications, the topology and the capability of the nodes may not be known beforehand and may not be static, and it may be expected that any A2B enabled device may be connected in the network at any point in time. Example embodiments of the technology disclosed herein can i) discover the network topology, ii) detect each node's capability, iii) receive input describing streams among the nodes, iv) determine slot and crossbar registers for each node defining audio routing (both between the nodes themselves and through crossbar switches to one or more peripherals connected to each node), and v) write to the corresponding registers in each node. In some examples, the technology can automatically detect changes in any of network topology, node capability, input describing streams among the nodes, determine the new registers and write the newly determined registers to the nodes.

Regarding nomenclature, for A2B, there are main and subordinate nodes. For SPI, there are controller and responder nodes. For midi-protocol, there is router and station or station device.

FIG. 1 is a block diagram of an illustrative half-duplex two-wire communication system (hereinafter, "system")

100, in accordance with examples of the technology disclosed herein. System 100 includes a host 110, a main node 102-1 and at least one sub node 102-2. In FIG. 1, three sub nodes (0, 1, and 2) are illustrated. The depiction of three sub nodes 102-2 in FIG. 1 is simply illustrative, and the system 100 may include one, two, or more sub nodes 102-2, as desired.

The main node 102-1 may communicate with the sub nodes 102-2 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the main node 102-1 to the sub node 0, a link coupling the sub node 0 to the sub node 1, and a link coupling the sub node 1 to the sub node 2. In some examples, the links of the bus 106 may each be formed of a single twisted-wire pair (e.g., an unshielded twisted pair). In some examples, the links of the bus 106 may each be formed of a coax cable (e.g., with the core providing the "positive" line and the shield providing the "negative" line, or vice versa). Referring back to FIG. 1, the two-wire bus links together provide a complete electrical path (e.g., a forward and a return current path) so that no additional ground or voltage source lines need be used.

The host 110 may include a processor that programs the main node 102-1, and acts as the originator and recipient of various payloads transmitted along the bus 106. In some examples, the host 110 may be or may include a microcontroller, for example. In particular, the host 110 may be the master of Inter-Integrated Circuit Sound (I2S) communications that happen along the bus 106. The host 110 may communicate with the main node 102-1 via an I2S/Time Division Multiplex (TDM) protocol, a Serial Peripheral Interface (SPI) protocol, and/or an Inter-Integrated Circuit (I2C) protocol. In some examples, the main node 102-1 may be a transceiver (e.g., the node transceiver 120 discussed below with reference to FIG. 2) located within a same housing as the host 110.

Referring to FIG. 1, the main node 102-1 may be programmable by the host 110 over the I2C bus for configuration and read-back, and may be configured to generate clock, synchronization, and framing for all the sub nodes 102-2. In some examples, an extension of the I2C control bus between the host 110 and the main node 102-1 may be embedded in the data streams transmitted over the bus 106, allowing the host 110 direct access to registers and status information for the one or more sub nodes 102-2, as well as enabling I2C-to-I2C communication over distance to allow the host 110 to control the peripheral devices 108.

In some examples, an extension of the SPI control bus between the host 110 and the main node 102-1 may be embedded in the data streams transmitted over the bus 106, allowing the host 110 direct access to registers and status information for the one or more sub nodes 102-2, as well as enabling SPI-to-SPI or SPI-to-I2C communication over distance to allow the host 110 to control the peripheral devices 108. In examples in which the system 100 is included in a vehicle, the host 110 and/or the main node 102-1 may be included in a headend of the vehicle.

Referring to FIG. 1, the main node 102-1 may generate "downstream" signals (e.g., data signals, power signals, etc., transmitted away from the main node 102-1 along the bus 106) and receive "upstream" signals (e.g., transmitted toward the main node 102-1 along the bus 106). The main node 102-1 may provide a clock signal for synchronous data transmission over the bus 106. As used herein, "synchronous data" may include data streamed continuously (e.g., audio signals) with a fixed time interval between two successive transmissions to/from the same node along the bus 106. In some examples, the clock signal provided by the main node 102-1 may be derived from an I2S input provided to the main node 102-1 by the host 110.

Referring to FIG. 1, a sub node 102-2 may be an addressable network connection point that represents a possible destination for data frames transmitted downstream on the bus 106 or upstream on the bus 106. A sub node 102-2 may also represent a possible source of downstream or upstream data frames. The system 100 may allow for control information and other data to be transmitted in both directions over the bus 106 from one node to the next. One or more of the sub nodes 102-2 may also be powered by signals transmitted over the bus 106.

In particular, each of the main node 102-1 and the sub nodes 102-2 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the main node 102-1 may include positive and negative upstream terminals, but these terminals may not be used; in other examples, the main node 102-1 may not include positive and negative upstream terminals. The last sub node 102-2 along the bus 106 (the sub node 2 in FIG. 1) may include positive and negative downstream terminals, but these terminals may not be used; in other examples, the last sub node 102-2 along the bus may not include positive and negative downstream terminals.

As discussed in detail below, the main node 102-1 may periodically send a synchronization control frame downstream, optionally along with data intended for one or more of the sub nodes 102-2. For example, the main node 102-1 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the sub nodes 102-2 to identify the beginning of each superframe and, in combination with physical layer encoding/signaling, may allow each sub node 102-2 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the sub nodes 102-2), conveyance of I2C information, conveyance of SPI information, remote control of certain general-purpose input/output (GPIO) pins at the sub nodes 102-2, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between sub nodes 102-2 (optionally along with other data, which may come from the main node 102-1 but additionally or alternatively may come from one or more upstream sub nodes 102-2 or from a sub node 102-2 itself) until it reaches the last sub node 102-2 (i.e., the sub node 2 in FIG. 1), which has been configured by the main node 102-1 as the last sub node 102-2 or has self-identified itself as the last sub node 102-2. Upon receiving the synchronization control frame, the last sub node 102-2 may transmit a synchronization response frame followed by any data that it is permitted to transmit (e.g., a 24-bit audio sample in a designated time slot). The synchronization response frame may be passed upstream between sub nodes 102-2 (optionally along with data from downstream sub nodes 102-2), and based on the synchronization response frame, each sub node 102-2 may be able to identify a time slot, if any, in which the sub node 102-2 is permitted to transmit.

In some examples, one or more of the sub nodes 102-2 in the system 100 may be coupled to and communicate with a peripheral device 108. For example, a sub node 102-2 may be configured to read data from and/or write data to the associated peripheral device 108 using I2S, pulse density modulation (PDM), TDM, SPI, and/or I2C protocols and/or interfaces, as discussed below. Although the "peripheral device 108" may be referred to in the singular herein, this is simply for ease of discussion, and a single sub node 102-2 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. Several examples of different peripheral device configurations are discussed in detail herein.

In some examples, the peripheral device 108 may include any device configured for I2S communication; the peripheral device 108 may communicate with the associated sub node 102-2 via the I2S protocol. In some examples, the peripheral device 108 may include any device configured for I2C communication; the peripheral device 108 may communicate with the associated sub node 102-2 via the I2C protocol. In some examples, the peripheral device 108 may include any device configured for SPI communication; the peripheral device 108 may communicate with the associated sub node 102-2 via the SPI protocol. In some examples, a sub node 102-2 may not be coupled to any peripheral device 108.

Referring to FIG. 1, a sub node 102-2 and its associated peripheral device 108 may be contained in separate housings and coupled through a wired or wireless communication connection or may be contained in a common housing. For example, a speaker connected as a peripheral device 108 may be packaged with the hardware for an associated sub node 102-2 (e.g., the node transceiver 120 discussed below with reference to FIG. 2), such that the hardware for the associated sub node 102-2 is contained within a housing that includes other speaker components. The same may be true for any type of peripheral device 108.

Referring to FIG. 1, as discussed above, the host 110 may communicate with and control the main node 102-1 using multi-channel I2S, SPI, and/or I2C communication protocols. For example, the host 110 may transmit data via I2S to a frame buffer (not illustrated) in the main node 102-1, and the main node 102-1 may read data from the frame buffer and transmit the data along the bus 106. Analogously, the main node 102-1 may store data received via the bus 106 in the frame buffer, and then may transmit the data to the host 110 via I2S.

Each sub node 102-2 may have internal control registers that may be configured by communications from the main node 102-1. Several such registers are discussed in detail below. Each sub node 102-2 may receive downstream data and may retransmit the data further downstream. Each sub node 102-2 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The main node 102-1 may be programmed (by the host 110) with a number of downstream portions to transmit to one or more of the sub nodes 102-2 and a number of upstream portions to receive from one or more of the sub nodes 102-2. Each sub node 102-2 may be programmed (by the main node 102-1) with a number of downstream portions to retransmit down the bus 106, a number of downstream portions to consume, a number of upstream portions to retransmit up the bus 106, and a number of upstream portions in which the sub node 102-2 may transmit data received from the sub node 102-2 from the associated peripheral device 108. Communication along the bus 106 is discussed in further detail below with reference to FIGS. 2-12.

Examples of the communication systems 100 disclosed herein are unique among conventional communication systems in that all sub nodes 102-2 may receive output data over the bus 106 within the same superframe (e.g., all sub nodes 102-2 may receive the same audio sample without sample delays between the nodes 102). In conventional communication systems, data may be buffered and processed in each node before being passed downstream in the next frame to the next node. Consequently, in these conventional communication systems, the latency of data transmission may depend on the number of nodes (with each node adding a delay of one audio sample). In the communication systems 100 disclosed herein, the bus 106 may only add one cycle of latency, no matter if the first or last sub node 102-2 receives the data. The same may be true for upstream communication; data may be available at an upstream node 102 in the next superframe, no matter which sub node 102-2 provided the data.

Further, in examples of the communication systems 100 disclosed herein, downstream data (e.g., downstream audio data) may be put on the bus 106 by the main node 102-1 or by any of the sub nodes 102-2 that are upstream of the receiving sub node 102-2; similarly, upstream data (e.g., upstream audio data) may be put on the bus 106 by any of the sub nodes 102-2 that are downstream of the receiving node 102 (i.e., the main node 102-1 or a sub node 102-2). Such capability may allow a sub node 102-2 to provide both upstream and downstream data at a specific time (e.g., a specific audio sample time). For audio data, this data may be received in the next audio sample at any downstream or upstream node 102 without further delays (besides minor processing delays that fall within the superframe boundary). As discussed further herein, control messages (e.g., in a synchronization control frame (SCF)) may travel to the last node 102 (addressing a specific node 102 or broadcast) and an upstream response (e.g., in a synchronization response frame (SRF)) may be created by the last downstream node 102 within the same superframe. Nodes 102 that have been addressed by the SCF may change the content of the upstream SRF with their own response. Consequently, within the same audio sample, a control and a response may be fully executed over multiple nodes 102. This is also in contrast to conventional communication systems, in which sample latencies may be incurred between nodes (for relaying messages from one node to the other).

Figure 2:
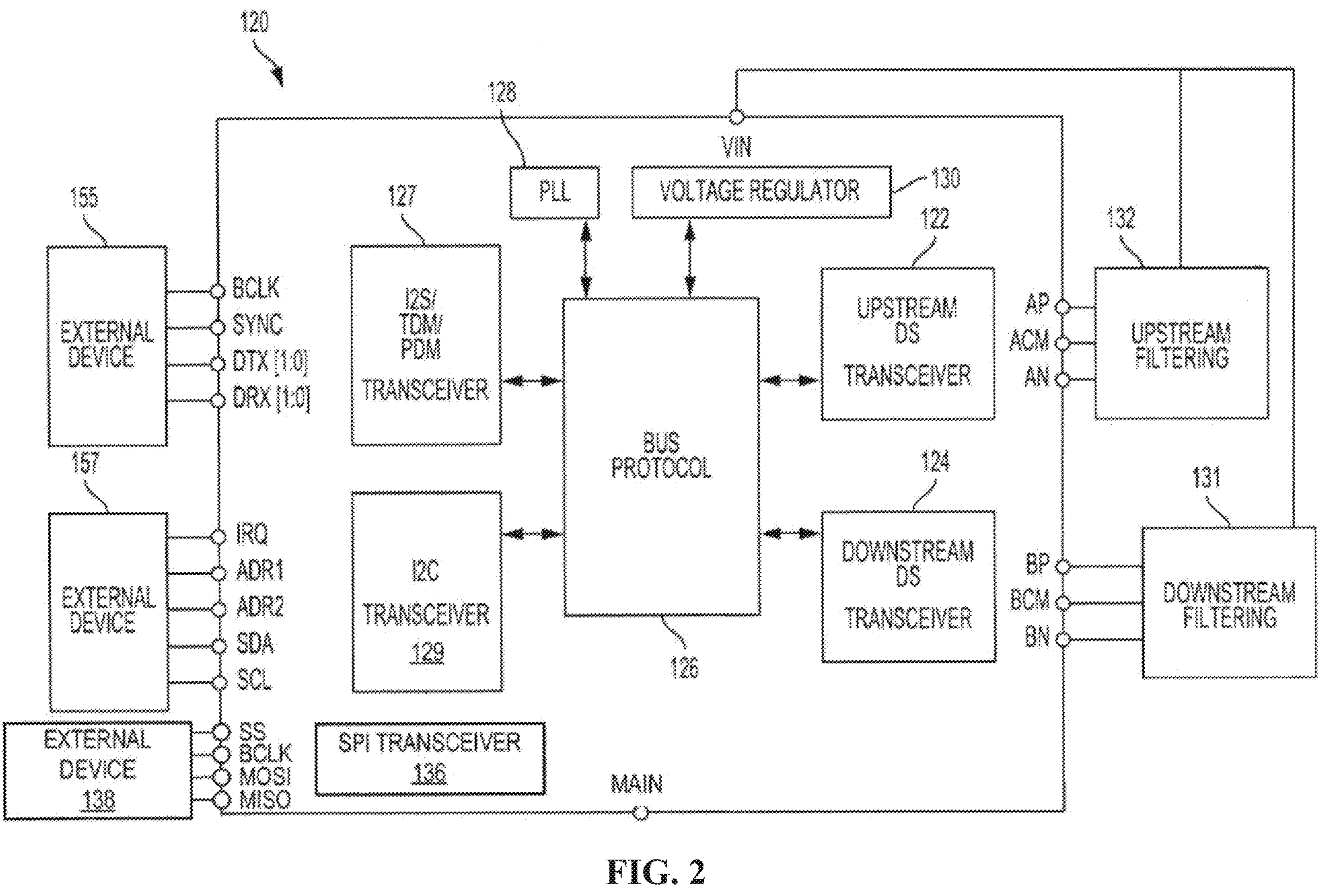
FIG. 2 is a block diagram of a node transceiver that may be included in a node of the system of FIG. 1, in accordance with examples of the technology disclosed herein.

Each of the main node 102-1 and the sub nodes 102-2 may include a transceiver to manage communication between components of the system 100. Referring to FIG. 2, and continuing to refer to prior figures for context, a block diagram of a node transceiver 120 that may be included in a node (e.g., the main node 102-1 or a sub node 102-2) of the system 100 of FIG. 1 is presented, in accordance with various examples. In some examples, a node transceiver 120 may be included in each of the nodes of the system 100, and a control signal may be provided to the node transceiver 120 via a main (MAIN) pin to indicate whether the node transceiver 120 is to act as a main node (e.g., when the MAIN pin is high) or a sub node (e.g., when the MAIN pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some examples, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the sub nodes 102-2 in the system 100 may receive power transmitted over the bus 106 concurrently with data. For power distribution (which is optional, as some of the sub nodes 102-2 may be configured to have exclusively local power provided to them), the main node 102-1 may place a DC bias on the bus link between the main node 102-1 and the sub node 0 (e.g., by connecting, through a low-pass filter, one of the downstream terminals to a voltage source provided by a voltage regulator and the other downstream terminal to ground). The DC bias may be a predetermined voltage, such as 5 volts, 8 volts, the voltage of a car battery, or a higher voltage. Each successive sub node 102-2 can selectively tap its upstream bus link to recover power (e.g., using the voltage regulator circuitry 130). This power may be used to power the sub node 102-2 itself (and optionally one or more peripheral device 108 coupled to the sub node 102-2). A sub node 102-2 may also selectively bias the bus link downstream for the next-in-line sub node 102-2 with either the recovered power from the upstream bus link or from a local power supply. For example, the sub node 0 may use the DC bias on the upstream link of the bus 106 to recover power for the sub node 0 itself and/or for one or more associated peripheral device 108, and/or the sub node 0 may recover power from its upstream link of the bus 106 to bias its downstream link of the bus 106.

Thus, in some examples, each node in the system 100 may provide power to the following downstream node over a downstream bus link. The powering of nodes may be performed in a sequenced manner. For example, after discovering and configuring the sub node 0 via the bus 106, the main node 102-1 may instruct the sub node 0 to provide power to its downstream link of the bus 106 in order to provide power to the sub node 1; after the sub node 1 is discovered and configured, the main node 102-1 may instruct the sub node 1 to provide power to its downstream link of the bus 106 in order to provide power to the sub node 2 (and so on for additional sub nodes 102-2 coupled to the bus 106). In some examples, one or more of the sub nodes 102-2 may be locally powered, instead of or in addition to being powered from its upstream bus link. In some such examples, the local power source for a given sub node 102-2 may be used to provide power to one or more downstream sub nodes.

In some examples, upstream bus interface circuitry 132 may be disposed between the upstream DS transceiver 122 and the voltage regulator circuitry 130, and downstream bus interface circuitry 131 may be disposed between the downstream DS transceiver 124 and the voltage regulator circuitry 130. Since each link of the bus 106 may carry AC (signal) and DC (power) components, the upstream bus interface circuitry 132 and the downstream bus interface circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the upstream DS transceiver 122 and downstream DS transceiver 124 from the DC component on the line to allow for high-speed bi-directional communications. As discussed above, the DC component may be tapped for power, and the upstream bus interface circuitry 132 and the downstream bus interface circuitry 131 may include a ferrite, a common mode choke, or an inductor, for example, to reduce the AC component provided to the voltage regulator circuitry 130. In some examples, the upstream bus interface circuitry 132 may be included in the upstream DS transceiver 122, and/or the downstream bus interface circuitry 131 may be included in the downstream DS transceiver 124; in other examples, the filtering circuitry may be external to the upstream DS transceiver 122 and downstream DS transceiver 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX [1:0]) and two receive pins (DRX [1:0]) are illustrated in FIG. 2, any desired number of receive and/or transmit pins may be used.

When the node transceiver 120 is included in the main node 102-1, the external device 155 may include the host 110, and the I2S/TDM/PDM transceiver 127 may provide an I2S slave (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a sub node 102-2, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the main node 102-1), and SDA and SCL are used for the I2C serial data and serial clock signals, respectively. When the node transceiver 120 is included in the main node 102-1, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a sub node 102-2, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include a transceiver 136 for SPI communication between the node transceiver 120 and an external device 138. Although the "external device 138" may be referred to in the singular herein, this is simply for ease of illustration, and multiple external devices may communicate with the node transceiver 120 via the SPI transceiver 136. As known in the art, the SPI protocol uses slave select (SS), clock (BCLK), master-out-slave-in (MOSI), and master-in-slave-out (MISO) data lines to provide data transfer, and pins corresponding to these four lines are illustrated in FIG. 2. The SPI transceiver 136 may be in communication with the bus protocol circuitry 126 and pins for communication with the external device 138. When the node transceiver 120 is included in the main node 102-1, the external device 138 may include the host 110 or another external device, and the SPI transceiver 136 may provide an SPI slave that can receive and respond to commands from the host 110 or other external device. When the node transceiver 120 is included in a sub node 102-2, the external device 138 may include a peripheral device 108 and the SPI transceiver 136 may provide an SPI host to allow the SPI transceiver 136 to send commands to one or more peripheral devices 108. The SPI transceiver 136 may include a read data first-in-first-out (FIFO) buffer and a write data FIFO buffer. The read data FIFO buffer may be used to collect data read from other nodes 102, and may be read by an external device 138 when the external device 138 transmits an appropriate read command. The write data FIFO buffer may be used to collect write data from the external device 138 before the write data is transmitted to another device.

The node transceiver 120 may include an interrupt request (IRQ) pin in communication with the bus protocol circuitry 126. When the node transceiver 120 is included in the main node 102-1, the bus protocol circuitry 126 may provide event-driven interrupt requests toward the host 110 via the IRQ pin. When the node transceiver 120 is included in a sub node 102-2 (e.g., when the MSTR pin is low), the IRQ pin may serve as a GPIO pin with interrupt request capability. The node transceiver 120 may include other pins in addition to those shown in FIG. 2 (e.g., as discussed below).

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PLLs of each node (e.g., the PLL 128) synchronized. In standby operational mode, reads and writes across the bus 106 are not supported. In a discovery operational mode, the main node 102-1 may send predetermined signals out along the bus 106 and wait for suitable responses to map out the topology of sub nodes 102-2 distributed along the bus 106. In a normal operational mode, full register access may be available to and from the sub nodes 102-2 as well as access to and from peripheral devices 108 over the bus 106. Normal mode may be globally configured by the host 110 with or without synchronous upstream data and with or without synchronous downstream data.

Figure 3:
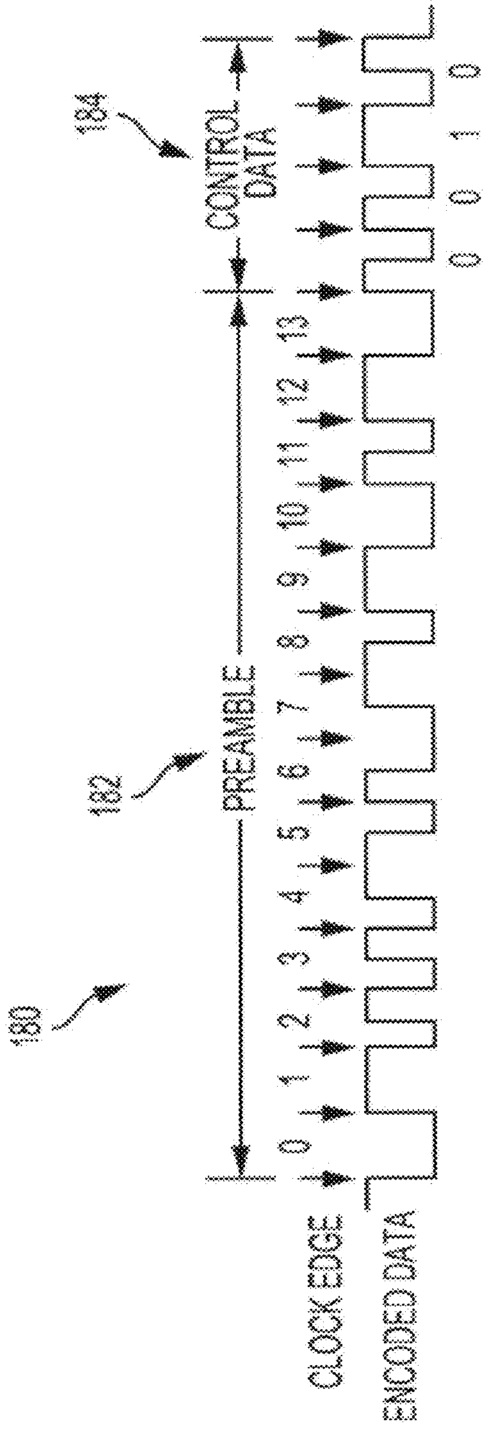
FIG. 3 is a diagram of a portion of a synchronization control frame used for communication in the system of FIG. 1, in accordance with examples of the technology disclosed herein.

Referring to FIG. 3, and continuing to refer to prior figures for context, a diagram of a portion of a synchronization control frame 180 used for communication in the system 100 is presented, in accordance with various examples. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the main node 102-1, while in an upstream portion, a synchronization response frame, and upstream data may be transmitted to the main node 102-1 from each of the sub nodes 102-2. The synchronization control frame 180 may include a preamble 182 and control data 184. Each sub node 102-2 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
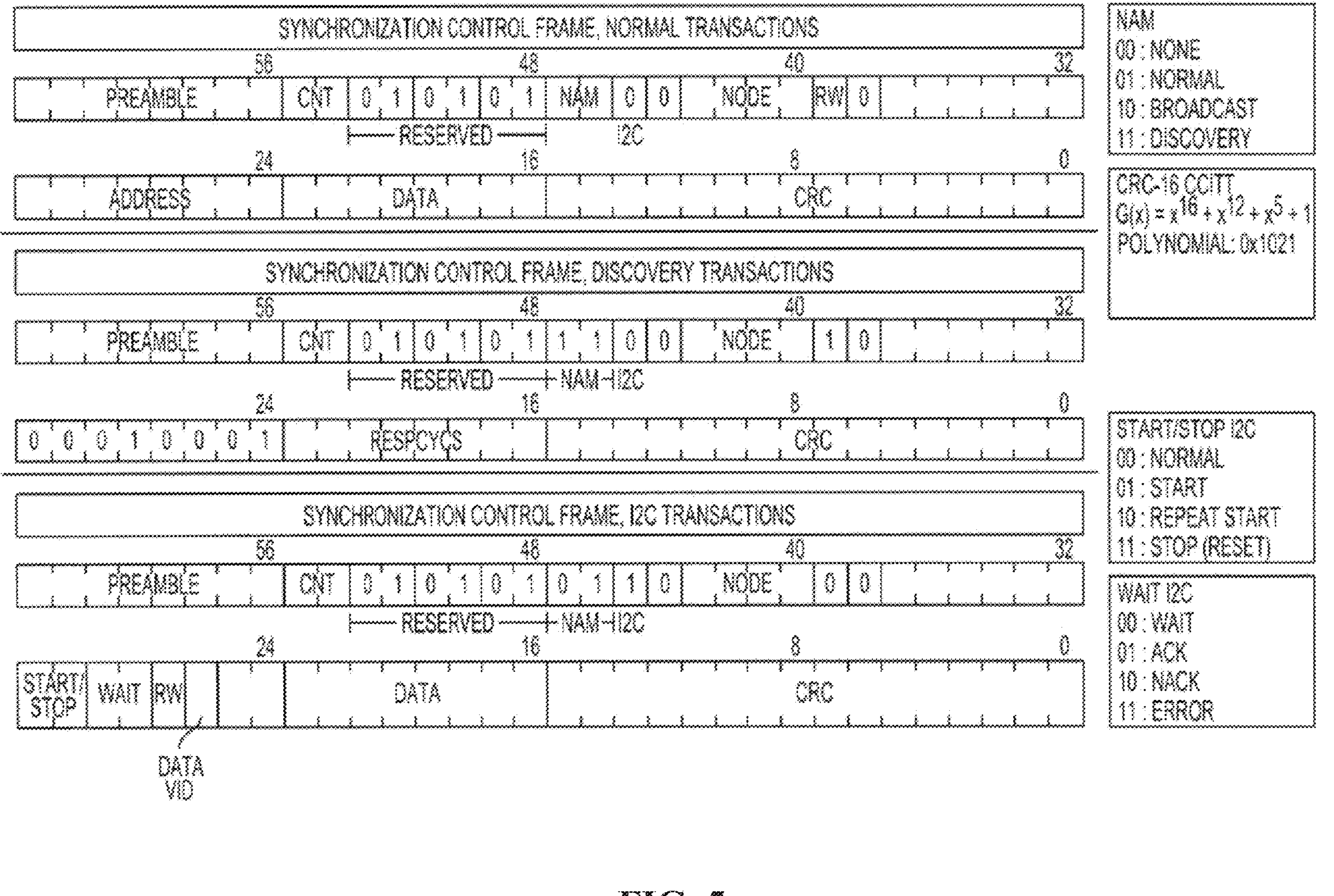
FIG. 5 illustrates example formats for a synchronization control frame in different modes of operation of the system of FIG. 1, in accordance with examples of the technology disclosed herein.

For example, in some examples, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. Referring to FIG. 5, and continuing to refer to prior figures for context, the preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the sub nodes 102-2 can receive a PLL synchronization signal from the bus 106 without requiring a crystal clock source at the sub nodes 102-2.

Figure 4:
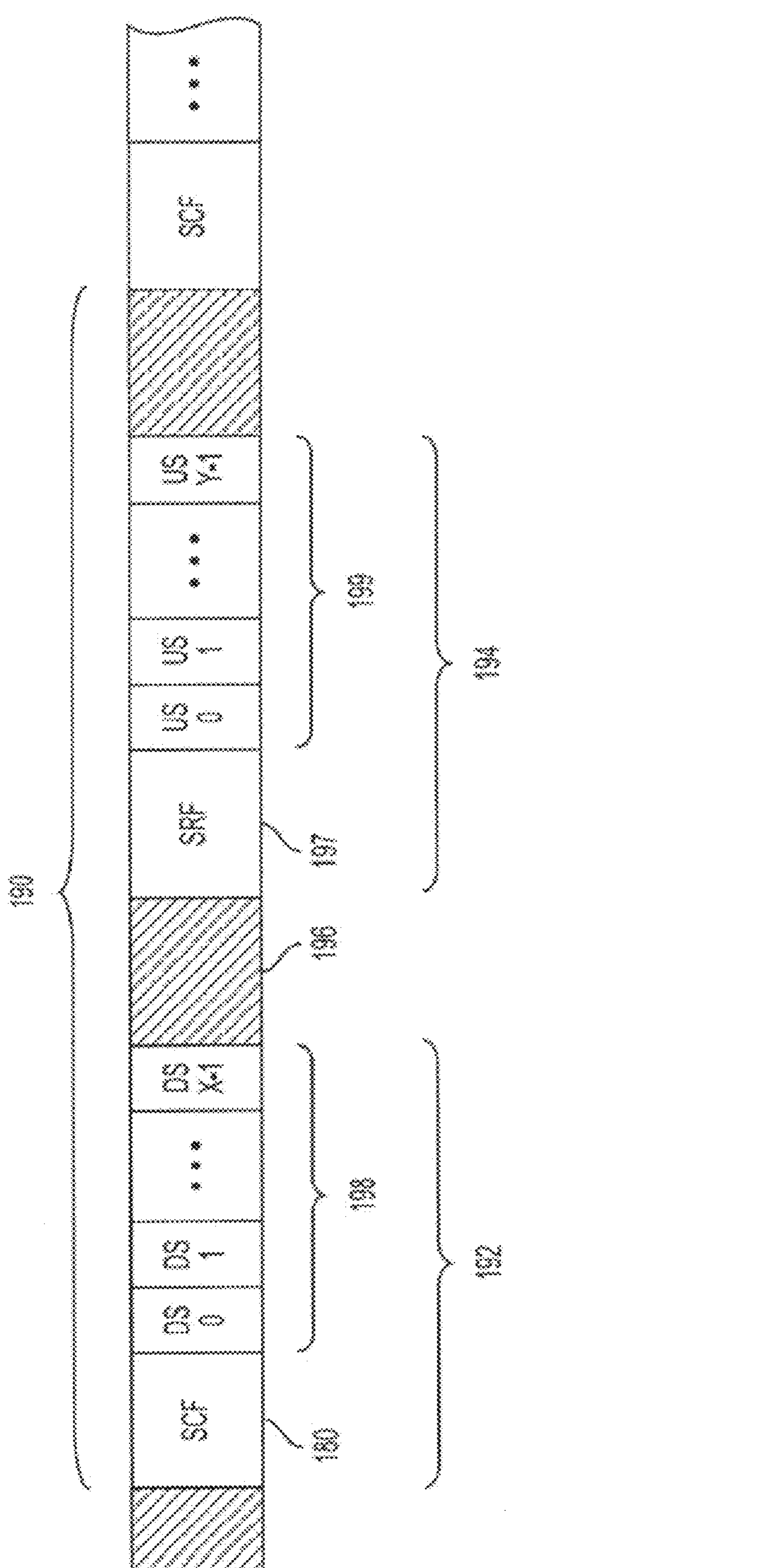
FIG. 4 is a diagram of a superframe used for communication in the system of FIG. 1, in accordance with examples of the technology disclosed herein.
Figure 6:
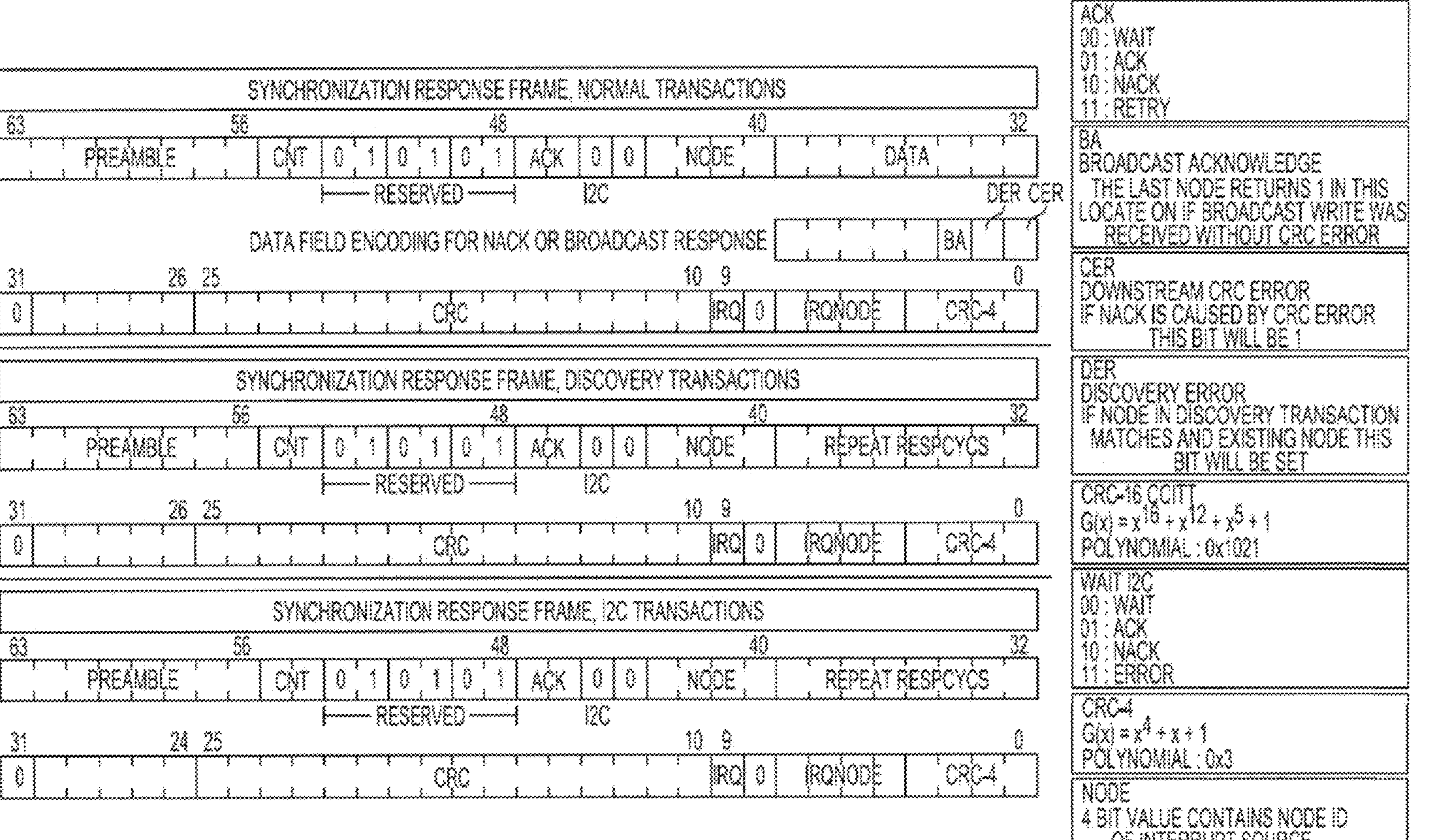
FIG. 6 illustrates example formats for a synchronization response frame at different modes of operation of the system of FIG. 1, in accordance with examples of the technology disclosed herein.

As noted above, communications along the bus 106 may occur in periodic superframes. Referring to FIG. 4, and continuing to refer to prior figures for context, a diagram of a superframe 190 is shown, in accordance with various examples. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some examples in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the main node 102-1 to the last sub node 102-2 (e.g., the sub node 102-2C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some examples in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some examples, each sub node 102-2 may consume a portion of the downstream data slots 198. The last sub node (e.g., sub node 2 in FIG. 1) may respond (after a predetermined response time stored in a register of the last sub node) with a synchronization response frame 197. Upstream, TDM, synchronous data may be added by each sub node 102-2 in the upstream data slots 199 directly after the synchronization response frame 197. The upstream data slots 199 may have equal width. A sub node 102-2 that is not the last sub node (e.g., the sub nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some examples, the synchronization control frame 180 may be 64 bits in length, but any other suitable length may be used. The synchronization control frame 180 may begin with the preamble 182, as noted above. In some examples, when the synchronization control frame 180 is retransmitted by a sub node 102-2 to a downstream sub node 102-2, the preamble 182 may be generated by the transmitting sub node 102-2, rather than being retransmitted.

The control data 184 of the synchronization control frame 180 may include fields that contain data used to control transactions over the bus 106. Examples of these fields are discussed below, and some examples are illustrated in FIG. 5. In particular, FIG. 5 illustrates example formats for the synchronization control frame 180 in normal mode, I2C mode, and discovery mode, in accordance with various examples. In some examples, a different preamble 182 or synchronization control frame 180 entirely may be used in standby mode so that the sub nodes 102-2 do not need to receive all of the synchronization control frame 180 until a transition to normal mode is sent.

In some examples, the synchronization control frame 180 may include a count (CNT) field. The CNT field may have any suitable length (e.g., 2 bits) and may be incremented (modulo the length of the field) from the value used in the previous superframe. A sub node 102-2 that receives a CNT value that is unexpected may be programmed to return an interrupt.

In some examples, the synchronization control frame 180 may include a node addressing mode (NAM) field. The NAM field may have any suitable length (e.g., 2 bits) and may be used to control access to registers of a sub node 102-2 over the bus 106. In normal mode, registers of a sub node 102-2 may be read from and/or written to based on the ID of the sub node 102-2 and the address of the register. Broadcast transactions are writes which should be taken by every sub node 102-2. In some examples, the NAM field may provide for four node addressing modes, including "none" (e.g., data not addressed to any particular sub node 102-2), "normal" (e.g., data unicast to a specific sub node 102-2 specified in the address field discussed below), "broadcast" (e.g., addressed to all sub nodes 102-2), and "discovery."

In some examples, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated sub node 102-2.

In some examples, the synchronization control frame 180 may include a node field. The node field may have any suitable length (e.g., 4 bits) and may be used to indicate which sub node is being addressed for normal and I2C accesses. In discovery mode, this field may be used to program an identifier for a newly discovered sub node 102-2 in a node ID register of the sub node 102-2. Each sub node 102-2 in the system 100 may be assigned a unique ID when the sub node 102-2 is discovered by the main node 102-1, as discussed below. In some examples, the main node 102-1 does not have a node ID, while in other examples, the main node 102-1 may have a node ID. In some examples, the sub node 102-2 attached to the main node 102-1 on the bus 106 (e.g., the sub node 0 in FIG. 1) will be sub node 0, and each successive sub node 102-2 will have a number that is 1 higher than the previous sub node. However, this is simply illustrative, and any suitable sub node identification system may be used.

In some examples, the synchronization control frame 180 may include a read/write (RW) field. The RW field may have any suitable length (e.g., 1 bit) and may be used to control whether normal accesses are reads (e.g., RW==1) or writes (e.g., RW==0).

In some examples, the synchronization control frame 180 may include an address field. The address field may have any suitable length (e.g., 8 bits) and may be used to address specific registers of a sub node 102-2 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some examples, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered sub node 102-2 to determine the appropriate time slot for upstream transmission.

In some examples, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some examples, the CRC may be calculated in accordance with the CCITT-CRC error detection scheme.

In some examples, at least a portion of the synchronization control frame 180 between the preamble 182 and the CRC field may be scrambled in order to reduce the likelihood that a sequence of bits in this interval will periodically match the preamble 182 (and thus may be misinterpreted by the sub node 102-2 as the start of a new superframe 190), as well as to reduce electromagnetic emissions as noted above. In some such examples, the CNT field of the synchronization control frame 180 may be used by scrambling logic to ensure that the scrambled fields are scrambled differently from one superframe to the next. Various examples of the system 100 described herein may omit scrambling.

Other techniques may be used to ensure that the preamble 182 can be uniquely identified by the sub nodes 102-2 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The main node 102-1 may send read and write requests to the sub nodes 102-2, including both requests specific to communication on the bus 106 and I2C requests. For example, the main node 102-1 may send read and write requests (indicated using the RW field) to one or more designated sub nodes 102-2 (using the NAM and node fields) and can indicate whether the request is a request for the sub node 102-2 specific to the bus 106, an I2C request for the sub node 102-2, or an I2C request to be passed along to an I2C-compatible peripheral device 108 coupled to the sub node 102-2 at one or more I2C ports of the sub node 102-2.

Turning to upstream communication, the synchronization response frame 197 may begin each upstream transmission. In some examples, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last sub node 102-2 on the bus 106 may wait until the RESPCYCS counter has expired and then begin transmitting a synchronization response frame 197 upstream. If an upstream sub node 102-2 has been targeted by a normal read or write transaction, a sub node 102-2 may generate its own synchronization response frame 197 and replace the one received from downstream. If any sub node 102-2 does not see a synchronization response frame 197 from a downstream sub node 102-2 at the expected time, the sub node 102-2 will generate its own synchronization response frame 197 and begin transmitting it upstream.

The data portion of the synchronization response frame 197 may include fields that contain data used to communicate response information back to the main node 102-1. Examples of these fields are discussed below, and some examples are illustrated in FIG. 6. In particular, FIG. 6 illustrates example formats for the synchronization response frame 197 in normal mode, I2C mode, and discovery mode, in accordance with various examples.

In some examples, the synchronization response frame 197 may include a count (CNT) field. The CNT field may have any suitable length (e.g., 2 bits) and may be used to transmit the value of the CNT field in the previously received synchronization control frame 180.

In some examples, the synchronization response frame 197 may include an acknowledge (ACK) field. The ACK field may have any suitable length (e.g., 2 bits), and may be inserted by a sub node 102-2 to acknowledge a command received in the previous synchronization control frame 180 when that sub node 102-2 generates the synchronization response frame 197. Example indicators that may be communicated in the ACK field include wait, acknowledge, not acknowledge (NACK), and retry. In some examples, the ACK field may be sized to transmit an acknowledgment by a sub node 102-2 that it has received and processed a broadcast message (e.g., by transmitting a broadcast acknowledgment to the main node 102-1). In some such examples, a sub node 102-2 also may indicate whether the sub node 102-2 has data to transmit (which could be used, for example, for demand-based upstream transmissions, such as non-TDM inputs from a keypad or touchscreen, or for prioritized upstream transmission, such as when the sub node 102-2 wishes to report an error or emergency condition).

In some examples, the synchronization response frame 197 may include an I2C field. The I2C field may have any suitable length (e.g., 1 bit) and may be used to transmit the value of the I2C field in the previously received synchronization control frame 180.

In some examples, the synchronization response frame 197 may include a node field. The node field may have any suitable length (e.g., 4 bits) and may be used to transmit the ID of the sub node 102-2 that generates the synchronization response frame 197.

In some examples, the synchronization response frame 197 may include a data field. The data field may have any suitable length (e.g., 8 bits), and its value may depend on the type of transaction and the ACK response of the sub node 102-2 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last sub node 102-2 may indicate if the broadcast write was received without error), a discovery error (DER) indicator (indicating whether a newly discovered sub node 102-2 in a discovery transaction matches an existing sub node 102-2), and a CRC error (CER) indicator (indicating whether a NACK was caused by a CRC error).

In some examples, the synchronization response frame 197 may include a CRC field. The CRC field may have any suitable length (e.g., 16 bits) and may be used to transmit a CRC value for the portion of the synchronization response frame 197 between the preamble and the CRC field.

In some examples, the synchronization response frame 197 may include an interrupt request (IRQ) field. The IRQ field may have any suitable length (e.g., 1 bit) and may be used to indicate that an interrupt has been signaled from a sub node 102-2.

In some examples, the synchronization response frame 197 may include an IRQ node (IRQNODE) field. The IRQNODE field may have any suitable length (e.g., 4 bits) and may be used to transmit the ID of the sub node 102-2 that has signaled the interrupt presented by the IRQ field. In some examples, the sub node 102-2 for generating the IRQ field will insert its own ID into the IRQNODE field.

In some examples, the synchronization response frame 197 may include a second CRC (CRC-4) field. The CRC-4 field may have any suitable length (e.g., 4 bits) and may be used to transmit a CRC value for the IRQ and IRQNODE fields.

In some examples, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any sub node 102-2 that needs to signal an interrupt to the main node 102-1 will insert its interrupt information into these fields. In some examples, a sub node 102-2 with an interrupt pending may have higher priority than any sub node 102-2 further downstream that also has an interrupt pending. The last sub node 102-2 along the bus 106 (e.g., the sub node 2 in FIG. 1) may always populate these interrupt fields. If the last sub node 102-2 has no interrupt pending, the last sub node 102-2 may set the IRQ bit to 0, the IRQNODE field to its node ID, and provide the correct CRC-4 value. For convenience, a synchronization response frame 197 that conveys an interrupt may be referred to herein as an "interrupt frame."

In some examples, at least a portion of the synchronization response frame 197 between the preamble 182 and the CRC field may be scrambled in order to reduce emissions. In some such examples, the CNT field of the synchronization response frame 197 may be used by scrambling logic to ensure that the scrambled fields are scrambled differently from one superframe to the next. Various examples of the system 100 described herein may omit scrambling.

Other techniques may be used to ensure that the preamble 182 can be uniquely identified by the sub nodes 102-2 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 197 will match it. Additionally or alternatively, the remainder of the synchronization response frame may be structured so that the synchronization sequence cannot occur, such as by placing fixed "0" or "1" values at appropriate bits.

Figure 7:
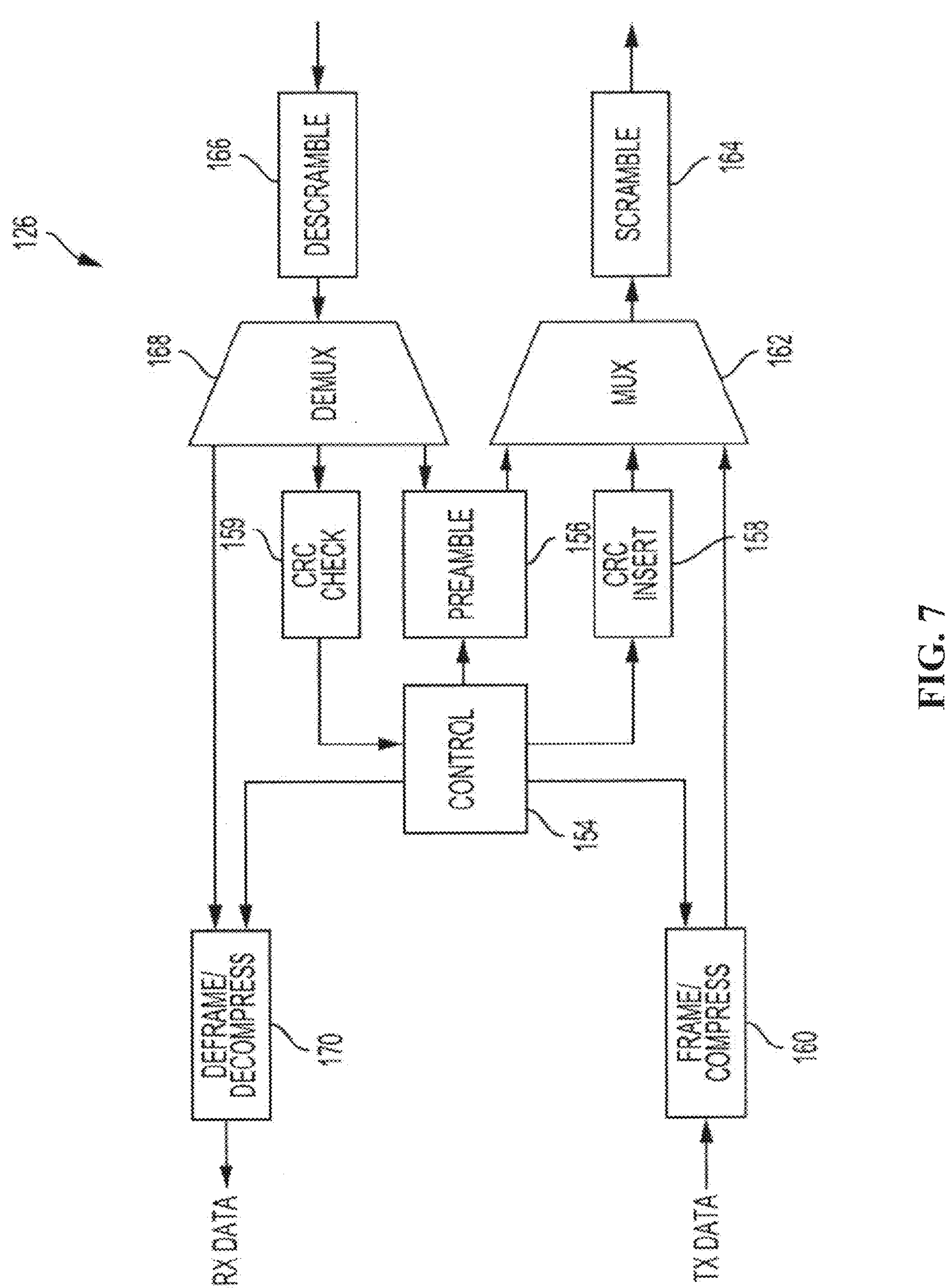
FIG. 7 is a block diagram of various components of the bus protocol circuitry of FIG. 2, in accordance with examples of the technology disclosed herein.

Referring to FIG. 7, and continuing to refer to prior figures for context, a block diagram of a portion of the bus protocol circuitry 126 of FIG. 2 is illustrated, in accordance with various examples. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a sub node 102-2 or from an I2C device when the bus protocol circuitry 126 is included in a main node 102-1), and adjust the framing to the different operational modes (e.g., normal, discovery, standby, etc.).

In examples of the technology disclosed herein, the bus protocol circuitry 126 includes a register-controlled mask (RXMASK, described below) and a frame buffer (RX frame buffer, described below) for receiving data from a peripheral and transferring the data to the A2B bus. In some examples of the technology disclosed herein, the bus protocol circuitry includes a second frame buffer (TX frame buffer, described below) and a register-controlled crossbar switch (TX crossbar, described below) for transferring data from the A2B bus and transmitting the data to a peripheral.

When the node transceiver 120 is preparing data for transmission along the bus 106, preamble circuitry 156 may be configured to generate preambles for synchronization frames for transmission, and to receive preambles from received synchronization frames. In some examples, a downstream synchronization control frame preamble may be sent by the main node 102-1 every 1024 bits. As discussed above, one or more sub nodes 102-2 may synchronize to the downstream synchronization control frame preamble and generate local, phase-aligned main clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127), the I2C transceiver 129, and/or the SPI transceiver 136, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some examples, the transmit stream may be scrambled by scrambling circuitry 164 before transmission.

For example, in some examples, the frame/compress circuitry 160 may apply a floating-point compression scheme. In such an example, the control circuitry 154 may transmit 3 bits to indicate how many repeated sign bits are in the number, followed by a sign bit and N-4 bits of data, where n is the size of the data to be transmitted over the bus 106. The use of data compression may be configured by the main node 102-1 when desired.

In some examples, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127), the I2C transceiver 129, and/or the SPI transceiver 136.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a main node 102-1, the values in these registers may be programmed into the control circuitry 154 by the host 110. When the control circuitry 154 is included in a sub node 102-2, the values in these registers may be programmed into the control circuitry 154 by the main node 102-1.

In some examples, the control circuitry 154 may include a downstream slots (DNSLOTS) register. When the node transceiver 120 is included in the main node 102-1, this register may hold the value of the total number of downstream data slots. This register may also define the number of data slots that will be used for combined I2S/TDM/PDM receive by the I2S/TDM/PDM transceiver 127 in the main node 102-1. In a sub node 102-2, this register may define the number of data slots that are passed downstream to the next sub node 102-2 before or after the addition of locally generated downstream slots, as discussed in further detail below with reference to LDNSLOTS.

In some examples, the control circuitry 154 may include a local downstream slots (LDNSLOTS) register. This register may be unused in the main node 102-1. In a sub node 102-2, this register may define the number of data slots that the sub node 102-2 will use and not retransmit. Alternatively, this register may define the number of slots that the sub node 102-2 may contribute to the downstream link of the bus 106.

In some examples, the control circuitry 154 may include an upstream slots (UPSLOTS) register. In the main node 102-1, this register may hold the value of the total number of upstream data slots. This register may also define the number of slots that will be used for I2S/TDM transmit by the I2S/TDM/PDM transceiver 127 in the main node 102-1. In a sub node 102-2, this register may define the number of data slots that are passed upstream before the sub node 102-2 begins to add its own data.

In some examples, the control circuitry 154 may include a local upstream slots (LUPSLOTS) register. This register may be unused in the main node 102-1. In a sub node 102-2, this register may define the number of data slots that the sub node 102-2 will add to the data received from downstream before it is sent upstream. This register may also define the number of data slots that will be used for combined I2S/TDM/PDM receive by the I2S/TDM/PDM transceiver 127 in the sub node 102-2.

In some examples, the control circuitry 154 may include a broadcast downstream slots (BCDNSLOTS) register. This register may be unused in the main node 102-1. In a sub node 102-2, this register may define the number of broadcast data slots. In some examples, broadcast data slots may always come at the beginning of the data field. The data in the broadcast data slots may be used by multiple sub nodes 102-2 and may be passed downstream by all sub nodes 102-2 whether or not they are used.

In some examples, the control circuitry 154 may include a slot format (SLOTFMT) register. This register may define the format of data for upstream and downstream transmissions. The data size for the I2S/TDM/PDM transceiver 127 may also be determined by this register. In some examples, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

In examples of the technology disclosed herein, the bus protocol circuitry 126 includes a downstream mask (DNMASK) register. The DNMASK register identifies those downstream slots containing information intended for the node of the bus protocol circuitry 126. In such examples, the bus protocol circuitry 126 includes an upstream mask (UPMASK) register. The UPMASK register identifies those upstream slots containing information intended for the node of the bus protocol circuitry 126.

Referring to FIGS. 8-11, and continuing to refer to prior figures for context, examples of information exchange along the bus 106 are illustrated, in accordance with various examples of the bus protocols described herein. In particular, FIGS. 8-11 illustrate examples in which each sub node 102-2 is coupled to one or more speakers and/or one or more microphones as the peripheral device 108. This is simply illustrative, as any desired arrangement of peripheral device 108 may be coupled to any particular sub node 102-2 in accordance with the techniques described herein.

Figure 8:
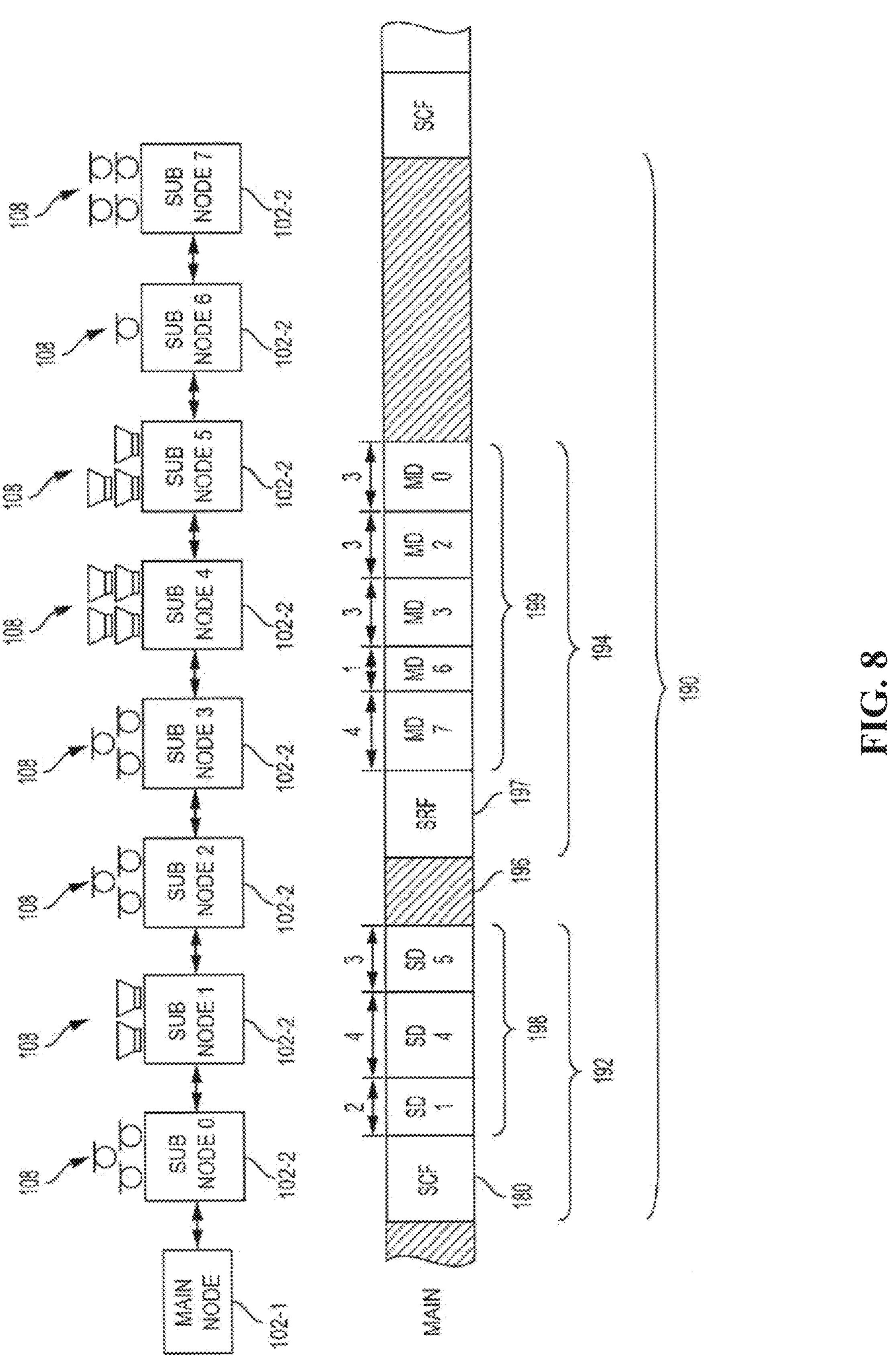
FIGS. 8-11 illustrate examples of information exchange along a two-wire bus, in accordance with examples of the technology disclosed herein.

To begin, FIG. 8 illustrates signaling and timing considerations for bi-directional communication on the bus 106, in accordance with various examples. The sub nodes 102-2 depicted in FIG. 8 have various numbers of sensor/actuator elements, and so different amounts of data may be sent to, or received from, the various sub nodes 102-2. Specifically, sub node 1 has two elements, sub node 4 has four elements, and sub node 5 has three elements, so the data transmitted by the main node 102-1 includes two time slots for sub node 1, four time slots for sub node 4, and three time slots for sub node 5. Similarly, sub node 0 has three elements, sub node 2 has three elements, sub node 3 has three elements, sub node 6 has one element, and sub node 7 has four elements, so the data transmitted upstream by those sub nodes 102-2 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the main node 102-1 or from other sub nodes 102-2) to produce a single data sample, which, depending on the type of processing, could correspond to a single time slot or multiple time slots.

In FIG. 8, the main node 102-1 transmits an SCF followed by data for speakers coupled to specific sub nodes 102-2 (SD). Each successive sub node 102-2 forwards the SCF and also forwards at least any data destined for downstream sub nodes 102-2. A particular sub node 102-2 may forward all data or may remove data destined for that sub node 102-2. When the last sub node 102-2 receives the SCF, that sub node 102-2 transmits the SRF optionally followed by any data that the sub node 102-2 is permitted to transmit. Each successive sub node 102-2 forwards the SRF along with any data from downstream sub nodes 102-2 and optionally inserts data from one or more microphones coupled to the particular sub nodes 102-2 (MD). In the example of FIG. 8, the main node 102-1 sends data to sub nodes 1, 4, and 5 (depicted in FIG. 8 as active speakers) and receives data from sub nodes 7, 6, 3, 2, and 0 (depicted in FIG. 8 as microphone arrays).

Figure 9:
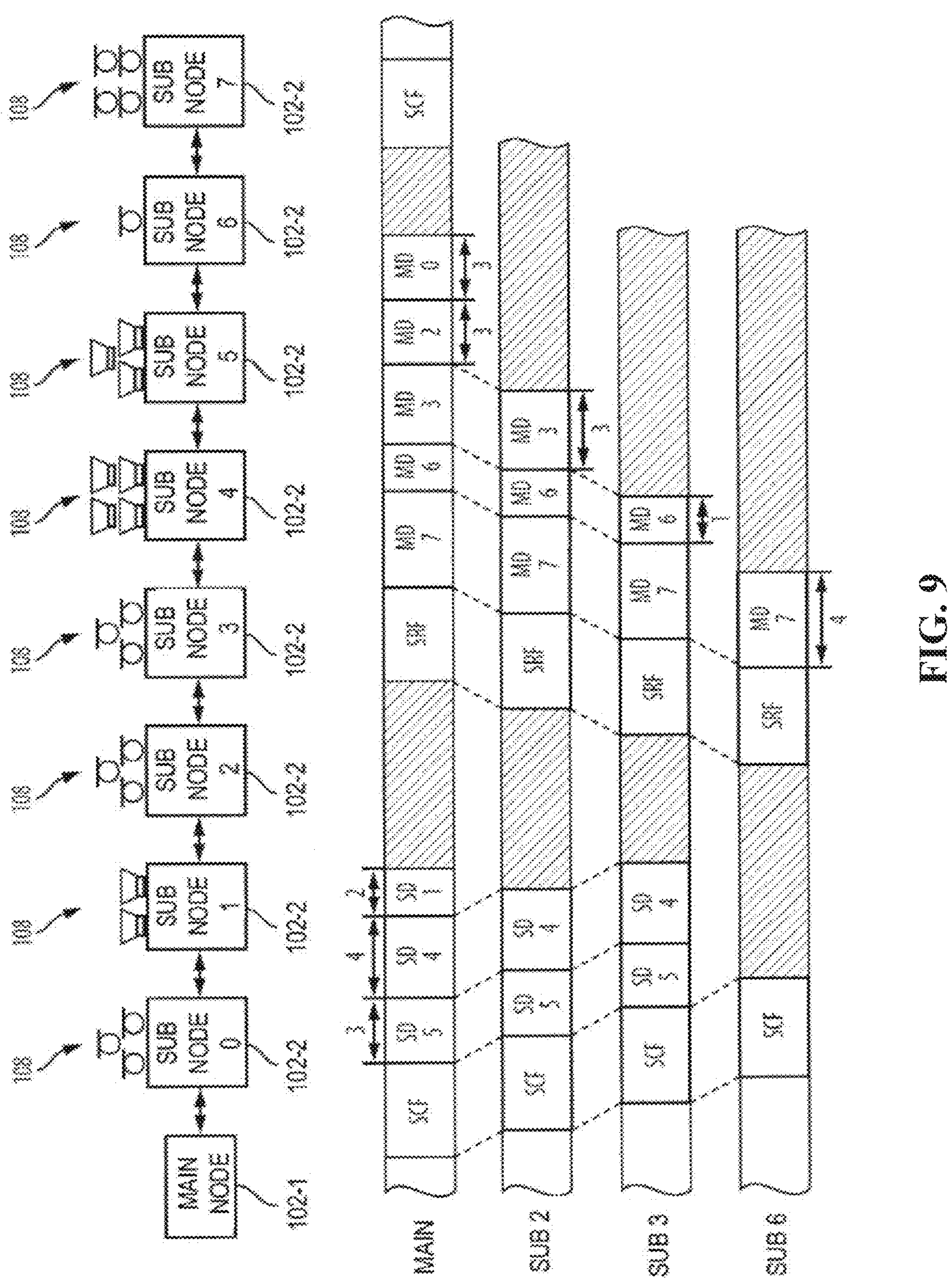

FIG. 9 schematically illustrates the dynamic removal of data from a downstream transmission and insertion of data into an upstream transmission, from the perspective of the downstream DS transceiver 124, in accordance with various examples. In FIG. 9, as in FIG. 8, the main node 102-1 transmits a SCF followed by data for sub nodes 1, 4, and 5 (SD) in reverse order (e.g., data for sub node 5 is followed by data for sub node 4, which is followed by data for sub node 1, etc.) (see the row labeled MAIN). When sub node 1 receives this transmission, sub node 1 removes its own data and forwards to sub node 2 only the SCF followed by the data for sub nodes 5 and 4. Sub nodes 2 and 3 forward the data unchanged (see the row labeled SUB 2), such that the data forwarded by sub node 1 is received by sub node 4 (see the row labeled SUB 3). Sub node 4 removes its own data and forwards to sub node 5 only the SCF followed by the data for sub node 5, and, similarly, sub node 5 removes its own data and forwards to sub node 6 only the SCF. Sub node 6 forwards the SCF to sub node 7 (see the row labeled SUB 6).

At this point, sub node 7 transmits to sub node 6 the SRF followed by its data (see the row labeled SUB 6). Sub node 6 forwards to sub node 5 the SRF along with the data from sub node 7 and its own data, and sub node 5 in turn forwards to sub node 4 the SRF along with the data from sub nodes 7 and 6. Sub node 4 has no data to add, so it simply forwards the data to sub node 3 (see the row labeled SUB 3), which forwards the data along with its own data to sub node 2 (see the row labeled SUB 2), which in turn forwards the data along with its own data to sub node 1. Sub node 1 has no data to add, so it forwards the data to sub node 0, which forwards the data along with its own data. As a result, the main node 102-1 receives the SRF followed by the data from sub nodes 7, 6, 3, 2, and 0 (see the row labeled MAIN).

Figure 10:
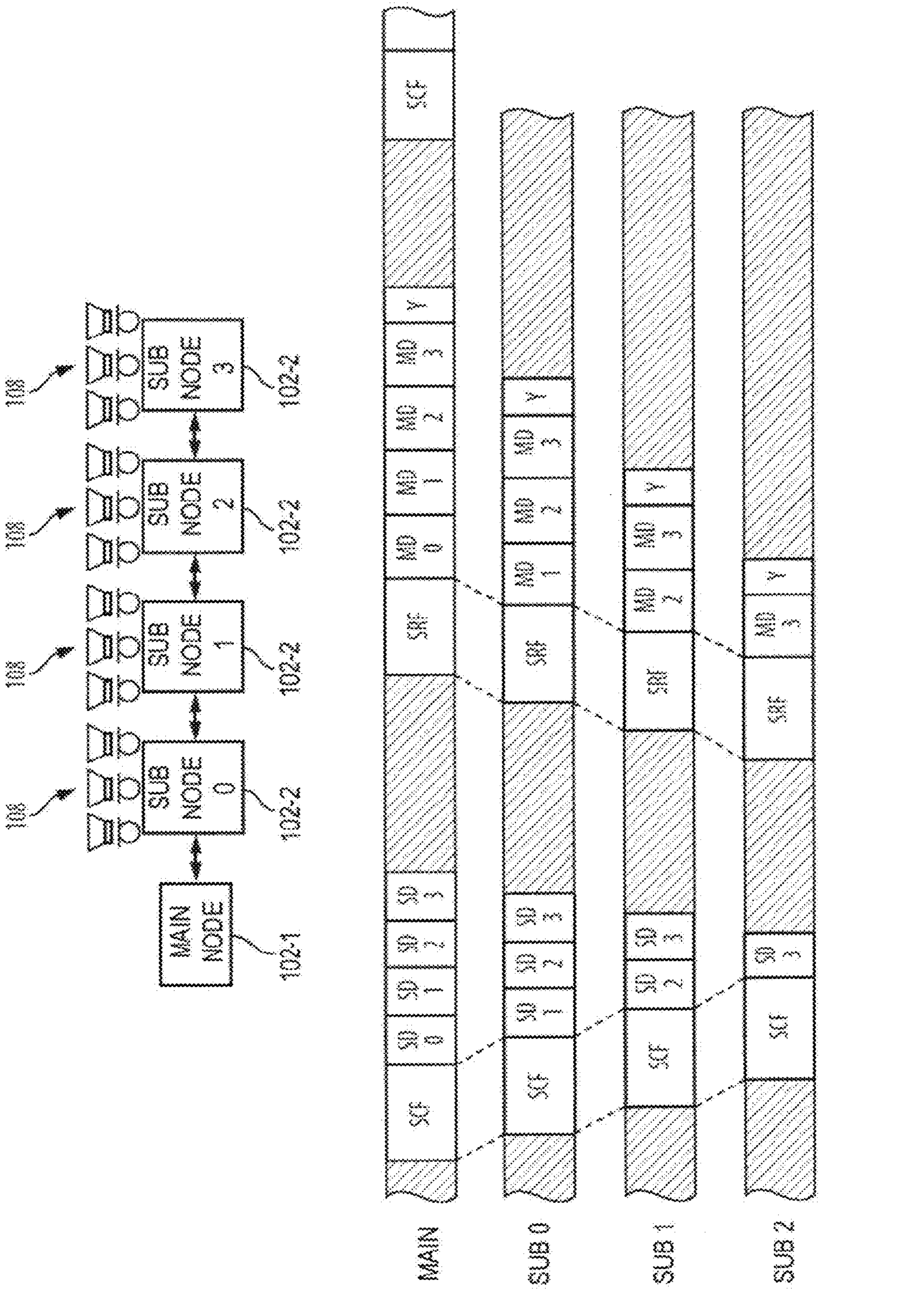

FIG. 10 illustrates another example of the dynamic removal of data from a downstream transmission and insertion of data into an upstream transmission, from the perspective of the downstream DS transceiver 124, as in FIG. 9, although in FIG. 10, the sub nodes 102-2 are coupled with both sensors and actuators as the peripheral device 108 such that the main node 102-1 sends data downstream to all of the sub nodes 102-2 and receives data back from all of the sub nodes 102-2. Also, in FIG. 10, the data is ordered based on the node address to which it is destined or from which it originates. The data slot labeled "Y" may be used for a data integrity check or data correction.

Figure 11:
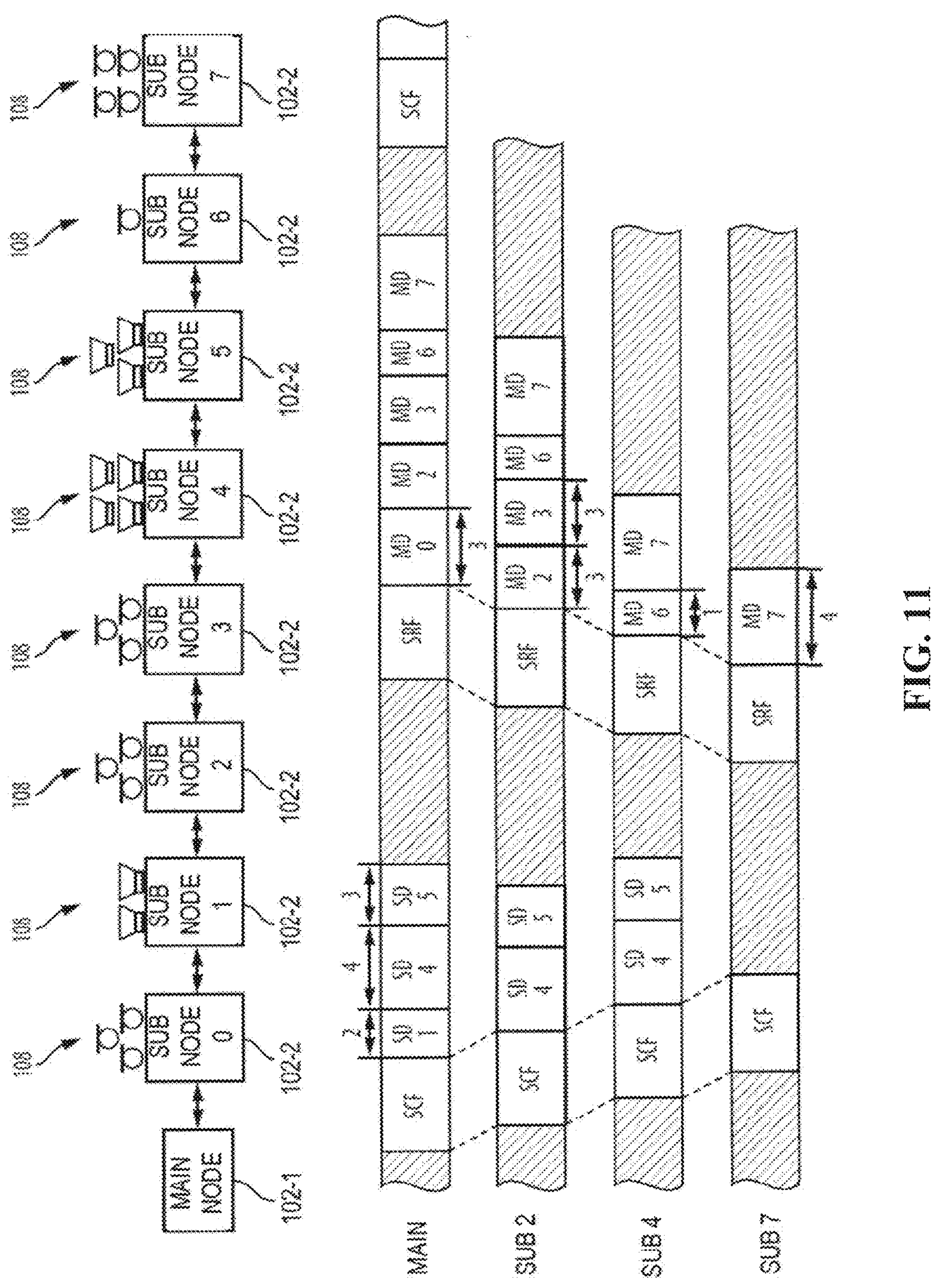

FIG. 11 illustrates another example of the dynamic removal of data from a downstream transmission and insertion of data into an upstream transmission, from the perspective of the downstream DS transceiver 124, as in FIG.

9, although in FIG. 11, the data is conveyed downstream and upstream in sequential order rather than reverse order. Buffering at each sub node 102-2 allows for selectively adding, removing, and/or forwarding data.

As discussed above, each sub node 102-2 may remove data from downstream or upstream transmissions and/or may add data to downstream or upstream transmissions. Thus, for example, the main node 102-1 may transmit a separate sample of data to each of a number of sub nodes 102-2, and each such sub node 102-2 may remove its data sample and forward only data intended for downstream sub nodes 102-2. On the other hand, a sub node 102-2 may receive data from a downstream sub node 102-2 and forward the data along with additional data. One advantage of transmitting as little information as needed is to reduce the amount of power consumed collectively by the system 100.

The system 100 may also support broadcast transmissions (and multicast transmissions) from the main node 102-1 to the sub nodes 102-2, specifically through configuration of the downstream slot usage of the sub nodes 102-2. Each sub node 102-2 may process the broadcast transmission and pass it along to the next sub node 102-2, although a particular sub node 102-2 may "consume" the broadcast message, (i.e., not pass the broadcast transmission along to the next sub node 102-2).

The system 100 may also support upstream transmissions (e.g., from a particular sub node 102-2 to one or more other sub nodes 102-2). Such upstream transmissions can include unicast, multicast, and/or broadcast upstream transmissions. With upstream addressing, as discussed above with reference to downstream transmissions, a sub node 102-2 may determine whether or not to remove data from an upstream transmission and/or whether or not to pass an upstream transmission along to the next upstream sub node 102-2 based on configuration of the upstream slot usage of the sub nodes 102-2. Thus, for example, data may be passed by a particular sub node 102-2 to one or more other sub nodes 102-2 in addition to, or in lieu of, passing the data to the main node 102-1. Such sub-sub relationships may be configured, for example, via the main node 102-1.

Thus, in various examples, the sub nodes 102-2 may operate as active/intelligent repeater nodes, with the ability to selectively forward, drop, and add information. The sub nodes 102-2 may generally perform such functions without necessarily decoding/examining all of the data, since each sub node 102-2 knows the relevant time slot(s) within which it will receive/transmit data, and hence can remove data from or add data into a time slot. Notwithstanding that the sub nodes 102-2 may not need to decode/examine all data, the sub nodes 102-2 may typically re-clock the data that it transmits/forwards. This may improve the robustness of the system 100.

Figure 12:
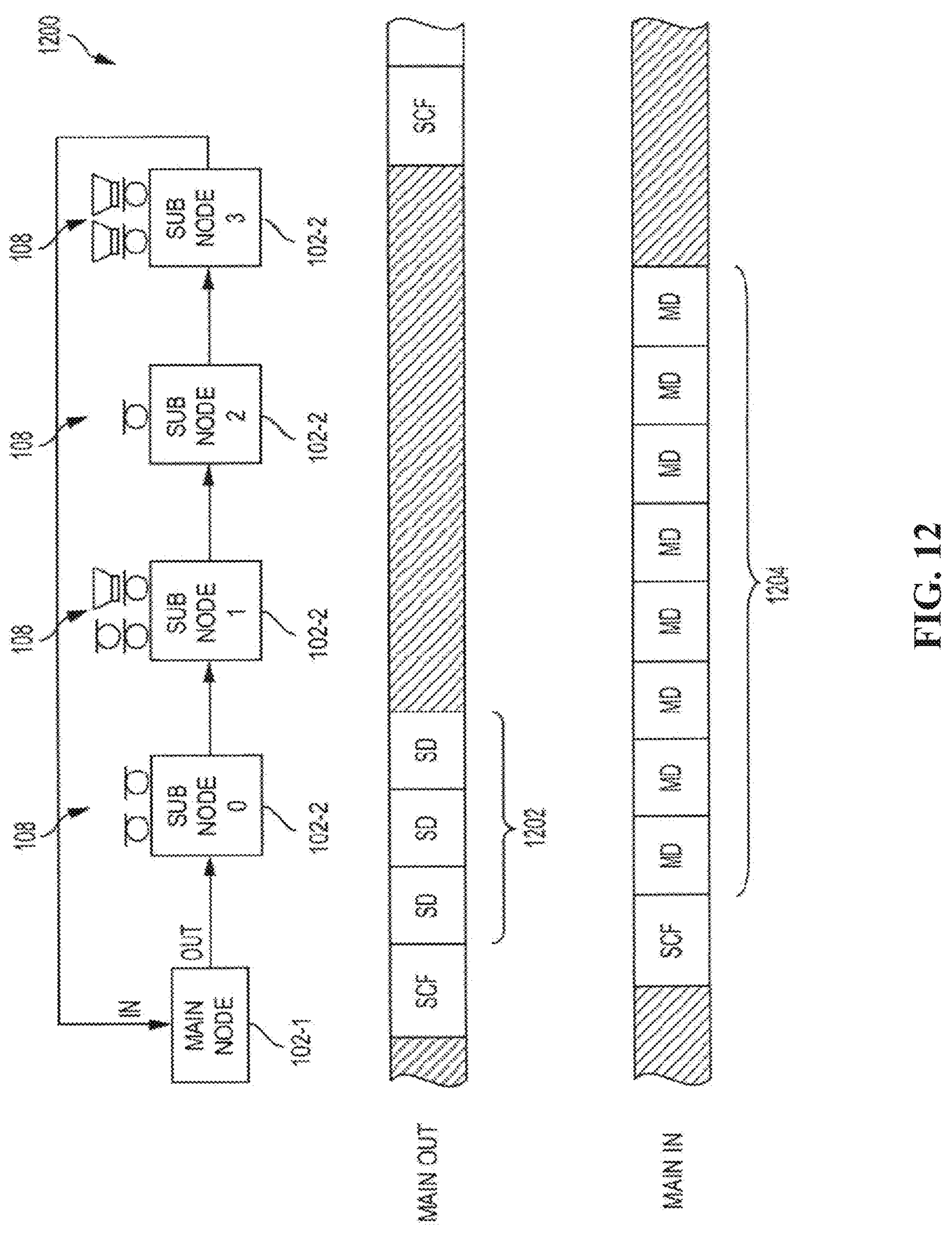
FIG. 12 illustrates a ring topology for the two-wire bus and a unidirectional communication scheme thereon, in accordance with examples of the technology disclosed herein.

In some examples, the bus 106 may be configured for unidirectional communications in a ring topology. For example, FIG. 12 illustrates an arrangement 1200 of the main node 102-1 and four sub nodes 102-2 in a ring topology, and illustrates signaling and timing considerations for unidirectional communication in the arrangement 1200, in accordance with various examples. In such examples, the node transceivers 120 in the nodes may include a receive-only transceiver (MAIN IN) and a transmit-only transceiver (MAIN OUT), rather than two bi-directional transceivers for upstream and downstream communication. In the link-layer synchronization scheme illustrated in FIG. 12, the main node 102-1 transmits a SCF 180, optionally followed by "downstream" data 1202 for the three speakers coupled to various sub nodes 102-2 (the data for the different speakers may be arranged in any suitable order, as discussed above with reference to FIGS. 8-11), and each successive sub node 102-2 forwards the synchronization control frame 180 along with any "upstream" data from prior sub nodes 102-2 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some examples, data may be sent as part of a set of synchronous data slots upstream (e.g., using the data slots 199) by a sub node 102-2 or downstream (e.g., using the data slots 198) by a sub node 102-2 or a main node 102-1. The volume of such data may be adjusted by changing the number of bits in a data slot or including extra data slots. Data may also be communicated in the system 100 by inclusion in a synchronization control frame 180 or a synchronization response frame 197. Data communicated this way may include I2C control data from the host 110 (with a response from a peripheral device 108 associated with a sub node 102-2); accesses to registers of the sub nodes 102-2 (e.g., for discovery and configuration of slots and interfaces) that may include write access from the host 110/main node 102-1 to a sub node 102-2 and read access from a sub node 102-2 to the host 110/main node 102-1; and event signaling via interrupts from a peripheral device 108 to the host 110. In some examples, GPIO pins may be used to convey information from a sub node 102-2 to the main node 102-1 (e.g., by having the main node 102-1 poll the GPIO pins over I2C, or by having a node transceiver 120 of a sub node 102-2 generate an interrupt at an interrupt request pin). For example, in some such examples, a host 110 may send information to the main node 102-1 via I2C, and then the main node 102-1 may send that information to the sub node 102-2 via the GPIO pins. Any of the types of data discussed herein as transmitted over the bus 106 may be transmitted using any one or more of these communication pathways. Other types of data and data communication techniques within the system 100 may be disclosed herein.

As mentioned above, while A2B technology was initially designed for automotive environments, it has application in non-automotive environments as well. One challenging use-case is supporting dynamic audio routing. In typical automotive environments, audio routing is predefined, e.g., during network design itself the ordering and the capability of A2B nodes in the network is statically defined. As an example, consider two devices in an automobile—e.g., a speaker and a microphone. In this example, the network design state is static and that there is an audio stream from microphone to the speaker. So, it is easy to derive slot configuration for both nodes.

But, for non-automotive use cases, like stage audio and conference room applications, the topology and the capability of the nodes may not be known beforehand and may not be static, and it is expected that any A2B-enabled device can be connected in the network at any point in time. Examples of the technology disclosed herein can i) discover the network topology, ii) detect each node's capability, iii) receive input describing streams among the nodes, iv) determine slot and crossbar registers for each node defining audio routing (both between the nodes themselves and through crossbar switches to one or more peripherals connected to each node), and v) write to the corresponding registers in each node. In some examples, the technology can automatically detect changes in any of network topology, node capability, and input describing streams among the nodes, and then determine the new registers and write the newly determined registers to the nodes.

Figure 13:
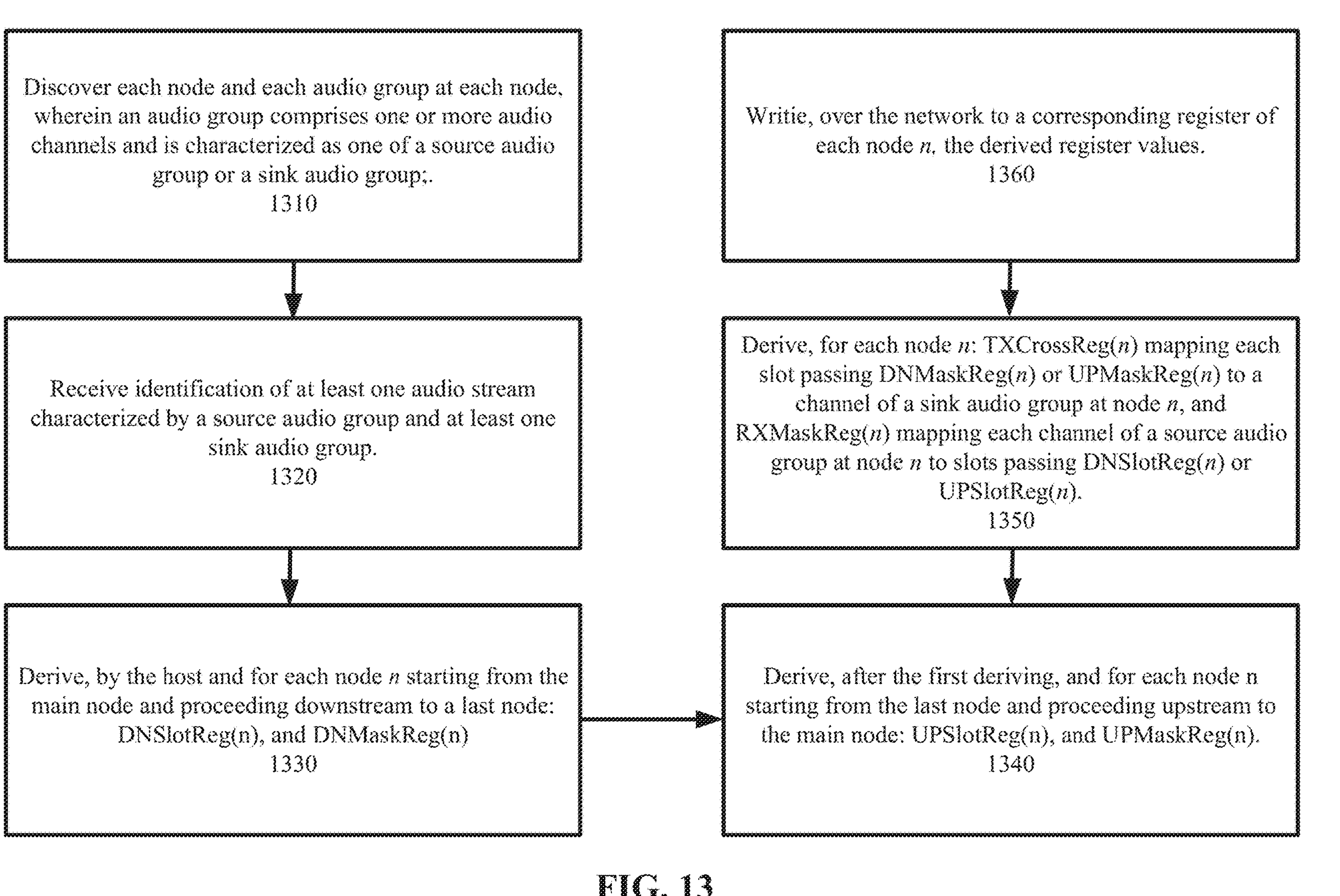
FIG. 13 is a block diagram of methods of dynamic audio routing over a network bus, in accordance with examples of the technology disclosed herein.

Referring to FIG. 13, and continuing to refer to prior figures for context, methods 1300 of dynamic audio routing over a network bus are illustrated, in accordance with examples of the technology disclosed herein. Such examples can be placed in the context of a network including a host, a main node, an ordered daisy chain of sub nodes, and at least one peripheral.

Figure 14:
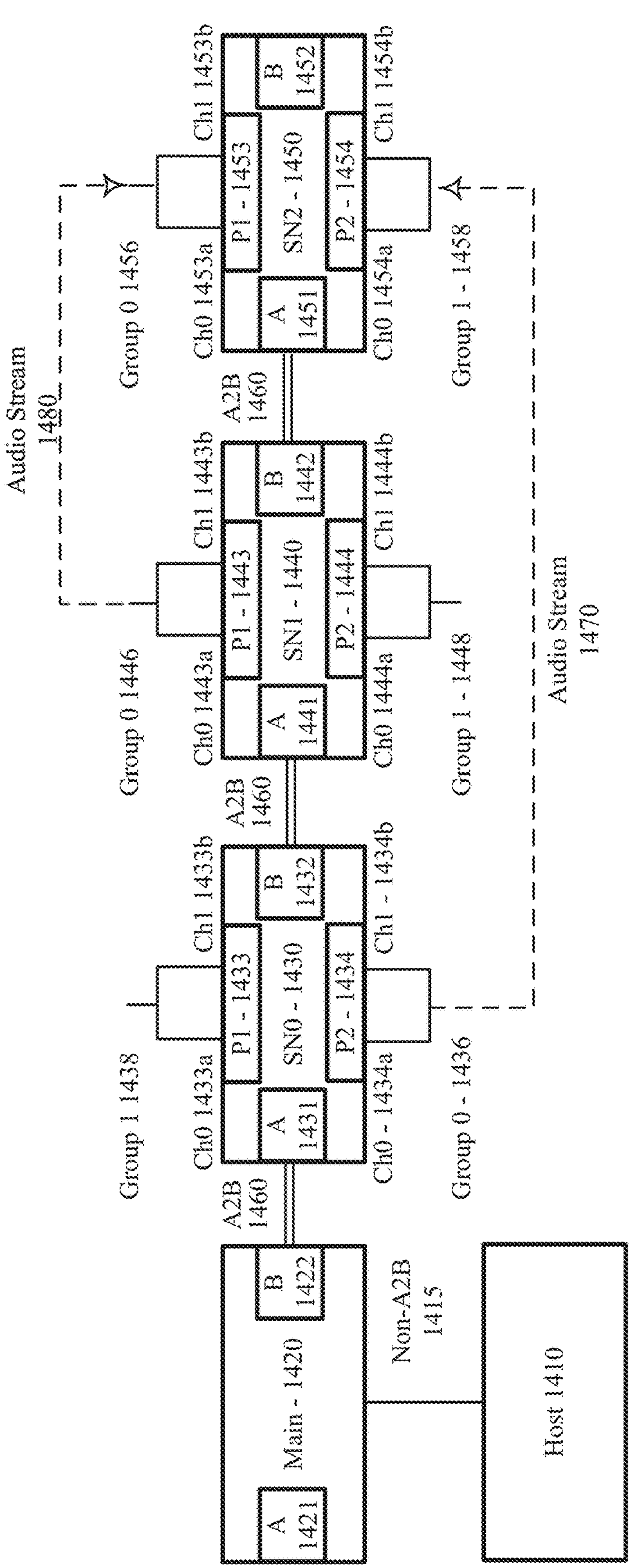
FIG. 14 is a block diagram of a network, in accordance with examples of the technology disclosed herein.

Referring to FIG. 14, and continuing to refer to prior figures for context, a network 1400 is illustrated as a continuing example of the technology disclosed herein. Network 1400 can be a small music studio network with three sub nodes.

In network 1400, host 1410 is a device such as host 110 described elsewhere herein. The host 1410 is in communication with the main node 1420 over a non-A2B communications link 1415, e.g., I2S/TDM, SPI, I2C as described elsewhere herein. Main node 1420, sub node 0 (SN0) 1430, sub node 1 (SN1) 1440, and sub node 2 (SN2) 1450 are each A2B transceivers, such as transceiver 120 described elsewhere herein—with main node 1420 configured as a main node via its MAIN pin. Each of main node 1420, SN0 1430, SN1 1440, and SN2 1450 include an A port and a B port, e.g., A port 1431 and B port 1432 of SN0 1430. Each of SN0 1430, SN1 1440, and SN2 1450 is associated with two peripherals, e.g., peripheral 1 (P1) 1433 and peripheral 2 (P2) 1434 of SN0 1430. While shown schematically as inside the box representing the sub node, each peripheral can be a separate device. Each peripheral is configured for two channels, e.g., channel 0 (Ch0) 1443*a* and channel 1 (Ch1) 1443*b* of SN1.P1 1443. The channels of each peripheral form a group, e.g., Group 0 (G0) 1456 is formed by SN2.P1.Ch0 1453*a* and SN2.P1Ch1 1453*b*. In network 1400, P2 1434 and P1 1443 are microphones and P1 1453 and P2 1454 are speakers—meaning that SN0.G0 1436 and SN1.G0 1446 are each a source group, while SN2.G0 1456 and SN2.G1 1458 are each sink groups.

The sub nodes (SN0 1430, SN1 1440, and SN2 1450) are connected via A2B bus 1460 in a daisy chain for communication with the main node 1420. Each peripheral is in communication with its associated sub node via a non-A2B communications link (not shown) such as I2S/TDM, SPI, I2C as described elsewhere herein.

Referring again to FIG. 13, The host discovers each node and each audio group at each node—Block 1310. In the continuing example of network 1400, the host 1410 uses the discovery process described elsewhere herein to determine the topology of network 1400. Host 1410 further determines that SN0.G0 1436 and SN1.G0 1446 are source groups (e.g., a microphone and a guitar pickup) and that SN0.G1 1438, SN1.G1 1448, SN2.G0 1456, and SN2.G1 1458 are all sink groups. The determination of audio capability is in addition to the basic A2B discovery process, e.g., by reading a non-volatile memory over the bus or by mailbox communication with micro connected to the sub node. In some examples, an audio group can include channels from more than one peripheral, e.g., audio coming from individual microphones can be grouped together (mic array).

Figure 15:
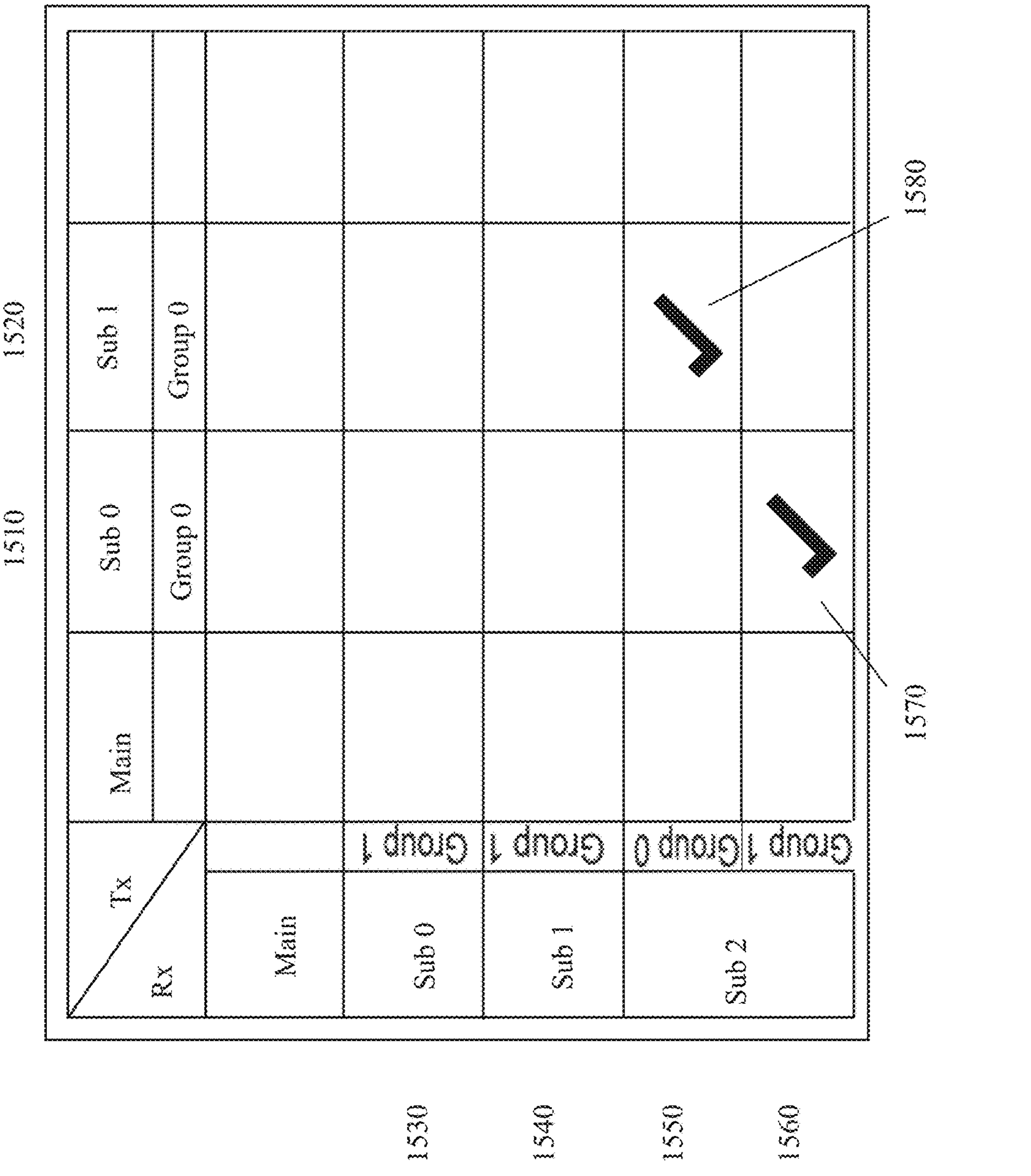
FIG. 15 illustrates a graphical user interface (GUI), in accordance with examples of the technology disclosed herein.

Referring again to FIG. 13, The host receives identification of at least one audio stream—Block 1320. Referring to FIG. 15, and continuing to refer to prior figures for context, in the example of network 1400, host 1410 presents the results of the discovery process via a graphical user interface (GUI) 1500. GUI 1500 is arranged as a matrix with each source group presented as a column, e.g., column 1510 for SN0.G0 1436 and column 1520 for SN1.G0 1446. GUI 1500 presents sink groups as separate rows, e.g., row 1530 for SN0.G1 1438, row 1540 for SN1.G1 1448, row 1550 for SN2.G0 1456, and row 1560 for SN2.G1 1458. In some examples, the technology can cache the connection information between sessions. During the next power cycle/network set up, cached information is checked against the unique chip id to retain the routing. This will help the user where routing information need not be re-entered everytime.

In the example of FIG. 14, host 1410 receives user input selecting matrix element 1570 corresponding to audio stream 1470 from SN0.G0 1436 (which carries Ch0 1434*a* and Ch1 1434*b* of P2 1434) downstream to SN2.G1 1458 (which corresponds to Ch0 1454*a* and Ch1 1454*b* of P2 1454). Host 410 receives user input selecting matrix element 1580 corresponding to audio stream 1480 from SN1.G0 1446 (which carries SN1.P1.Ch0 1443*a* and SN1.P1Ch1 1443*b*) downstream to SN2.G0 1456 (which corresponds to SN2.P1.Ch0 1453*a* and SN2.P1.Ch1 1453*b*).

Figure 16:
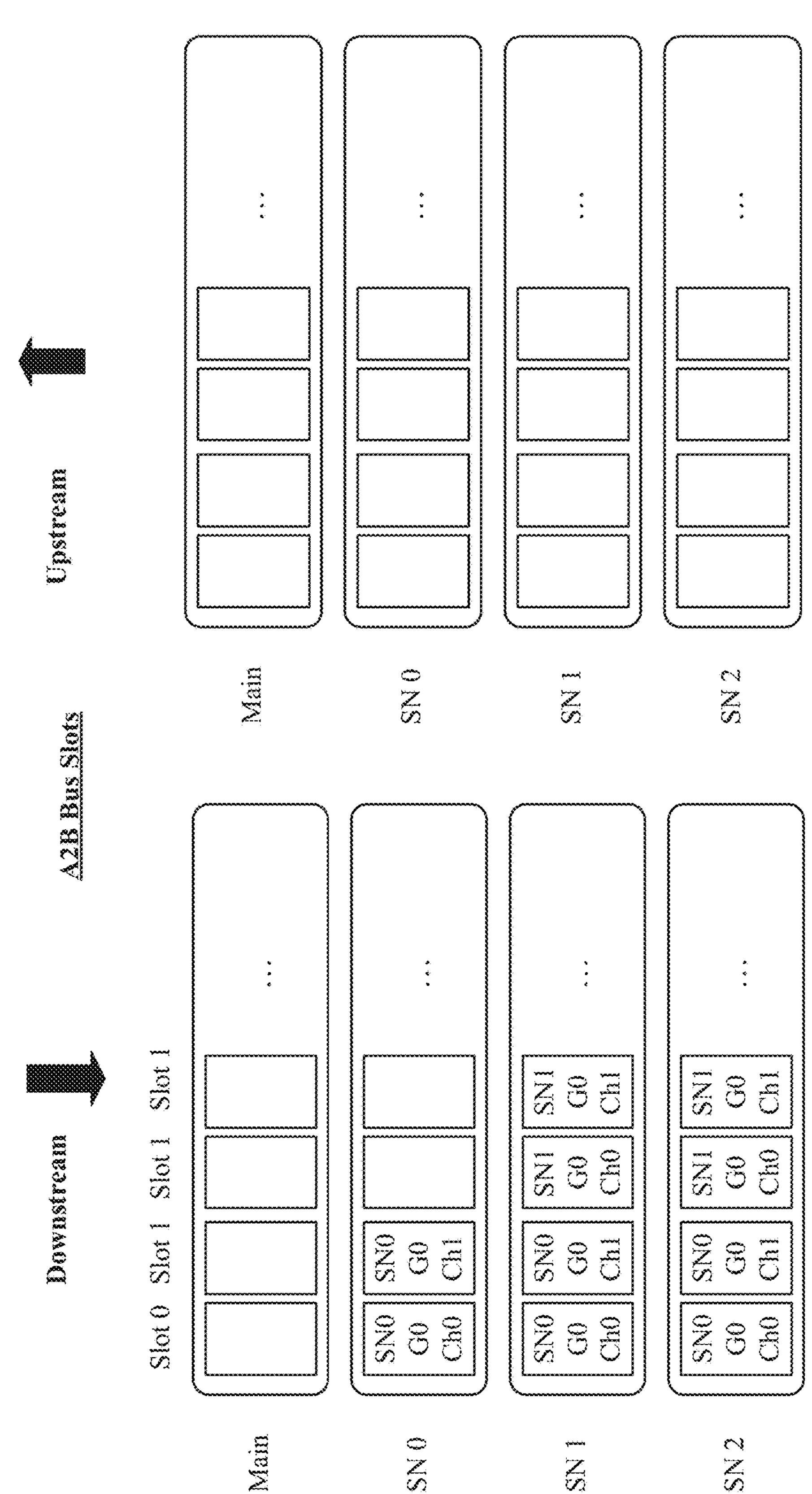
FIG. 16 illustrates data structure for the network of FIG. 14 from network lists can be derived in accordance with examples of the technology disclosed herein.

In some examples, the host 1410 maintains a series of audio stream lists (sorted by group identifier) for each node n, including: [1] a downstream source list identifying each stream that has at least one sink downstream from node n, DSSourceList(n); [2] an upstream source list identifying each stream that has at least one sink upstream from node n, USSourceList(n); [3] a downstream sink list identifying each stream used in node n from the downstream that has a source upstream from node n, DSSinkList(n); and [4] an upstream sink list identifying each stream used in node n from the upstream that has a source downstream from node n, USSinkList(n). Referring to FIG. 16, and continuing to refer to prior figures for context, a data structure 1600 for network 1400 from which each list can be derived is shown.

While the example of FIG. 14 identifies two downstream single sink audio streams, the technology supports identification of upstream audio streams and multiple sink audio streams. While the example of FIG. 14 shows a network topology without peripherals at the main node, the technology supports topologies with peripherals at the main node.

Referring again to FIG. 13, for each node n starting from the main node and proceeding downstream to a last node, the host derives register values DNMaskReg(n) identifying slots associated with each audio stream having a source audio group upstream of node n and a sink audio group at node n, and register values DNSlotReg(n) identifying slots associated with each audio stream having a source audio group upstream of node n and at least one sink audio group downstream of node n—Block 1330.

In the example of FIG. 14, for each node n starting from the main node 1420, the host 1410 creates/updates a pass downstream list PassDSList(n). At the main node 1420, PassDSList(main) is the same as DSSourceList(main). DNSlotReg(main) is assigned the slot indexes from DSSourceList(main) as the sum of all the downstream streams. For sub node n, for each stream in DSSink_list(n), the host 1410 identifies the slot index within PassDSList(n−1) and derives DNMaskReg(n) based on the slot index. The host 1410 then prunes the PassDSList(n−1) by removing, from the end of the list, streams with no destination downstream, and updates the DNSlotReg(n) as the sum of all the channels within the pruned PassDSList(n−1). Finally, the host 1410 adds slots for DSSourceList(n) to PassDSList(n−1) to form PassDSList(n). While in the example of FIG. 14, Block 1330 is described after Block 1320, that order is not necessarily, however both Block 1320 and Block 1330 should be completed before starting Block 1340.

Figure 17:
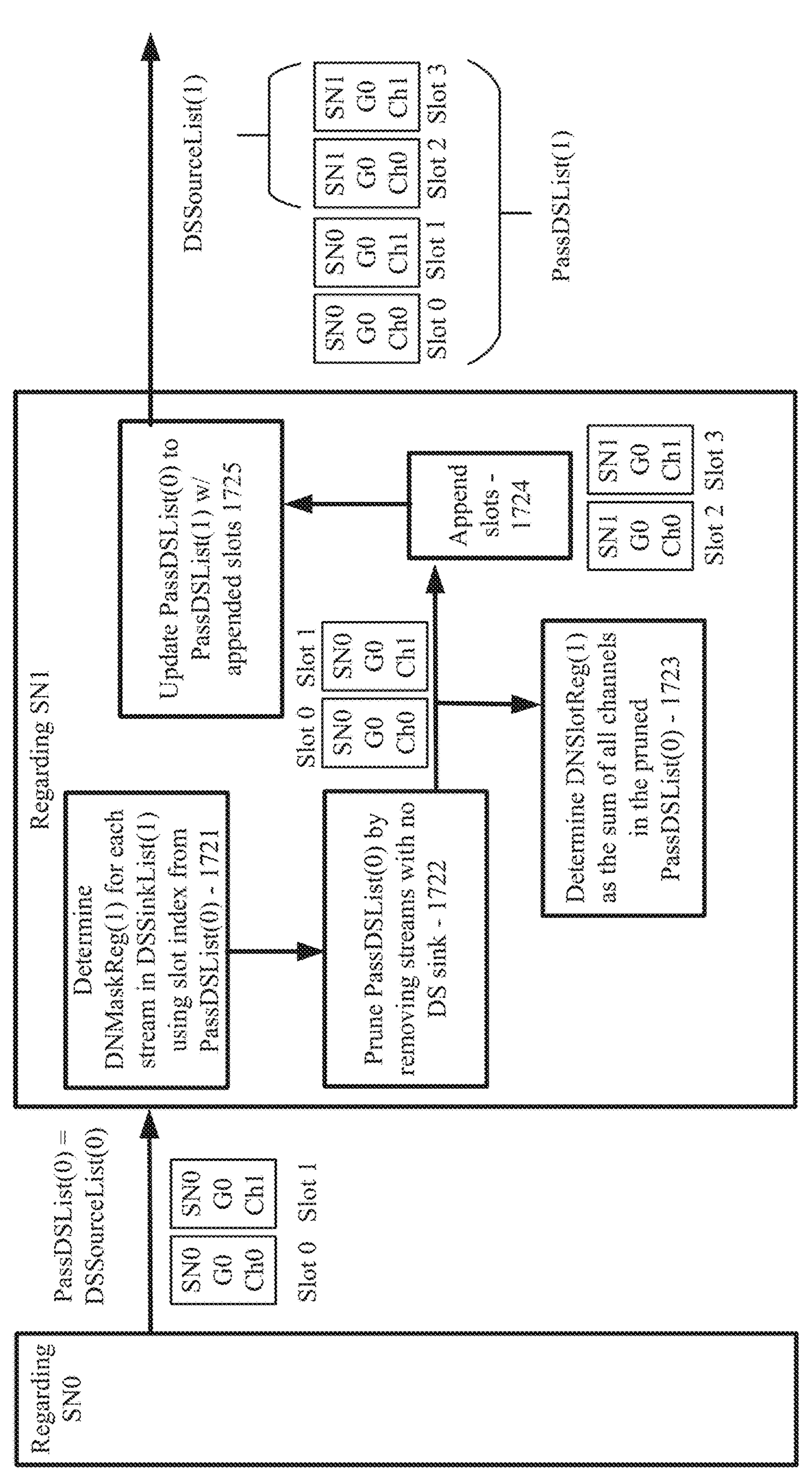
FIG. 17 illustrates processes for the network of FIG. 14, in accordance with examples of the technology disclosed herein.

Referring to FIG. 17, and continuing to refer to prior figures for context, process 1700 illustrates the above operations in the context of continuing example of FIG. 14. Note that PassDSList(0)=DSSourceList(0)—so SN0 G0 Ch0 1434*a* is allocated slot 1 of the relevant frame, and SN0 G0 Ch1 1434*b* is allocated slot 2 since SN0 G0 1425 was added to the bus in downstream as audio stream 1470 at SN0 1430. When dealing with SN1 1440 the host 1410 determines DNMaskReg(1) for each stream in DSSinkList(1) using slot index from PassDSList(0)—Block 1721. In this case, no slots are read by SN1 1440 in downstream, so DNMaskReg (1) is empty. As similar result follows with Block 1722, since there are no streams without a downstream sink, and no slots are pruned—leaving PassDSList(0) unchanged. Similarly, with Block 1723, host 1410 determines DNSlotReg(1) as the sum of all channels in the pruned (no effect) PassDSList(0), i.e., SN0 G0 Ch0 remains allocated to slot 1 of the relevant frame, and SN0 G0 Ch1 remains allocated to slot 2. The host 1410 appends (Block 1724) SN1 G0 1443 slots for SN1 G0 Ch0 1443*a* and SN1 G0 Ch1 1443*b* to the slots already allocated to the frame. The host 1410 then updates (Block 1725) PassDSList(0) to PassDSList(1) w/appended slots—resulting in a DSSourceList(1) and PassDSList(1) as indicated.

Referring again to FIG. 13, for each node n, starting from the last node and proceeding upstream to a main node, the host derives register values UPMaskReg(n) identifying slots associated with each audio stream having a source audio group downstream of node n and a sink audio group at node n, and register values UPSlotReg(n) identifying slots associated with each audio stream having a source audio group downstream of node n and at least one sink audio group upstream of node n—Block 1340. Since there are no upstream streams in the example of FIG. 14, upstream registers do not have to be derived by the host 1410. When there are upstream streams to be accounted for, host 1410 operates in complementary way to that described with regard to downstream streams.

Figure 18:
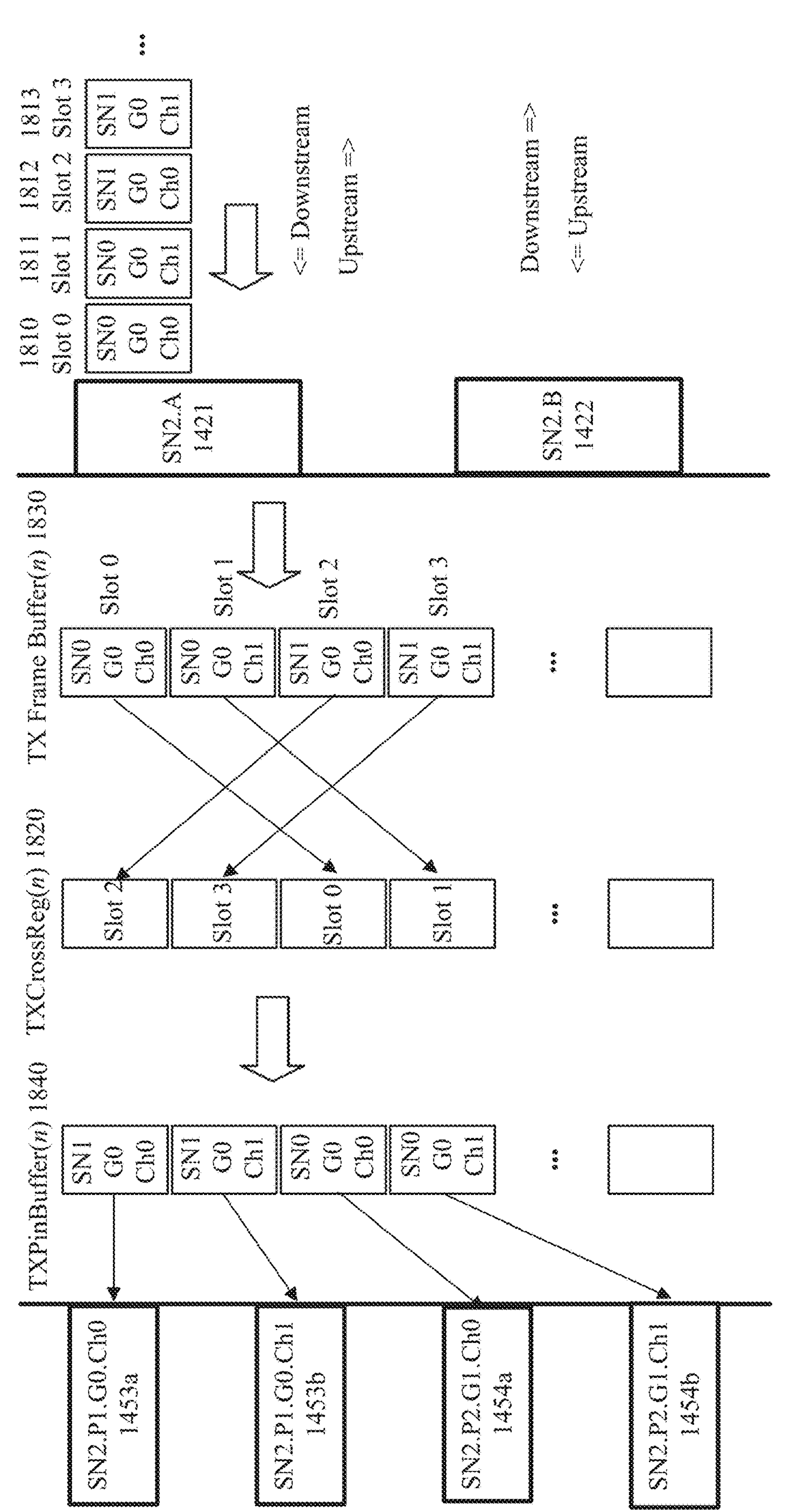
FIG. 18 illustrates a downstream flow of the data to a node for the example of FIG. 14, in accordance with examples of the technology disclosed herein.

For each node n, the host derives: TXCrossReg(n) mapping each slot passing DNMaskReg(n) or UPMaskReg(n) to a channel of a sink audio group at node n, and RXMaskReg (n) mapping each channel of a source audio group at node n to slots passing DNSlotReg(n) or UPSlotReg(n)—Block 1350. Referring to FIG. 18 and continuing to refer to prior figures for context, a downstream flow 1800 of the data to SN2 1450 of the example of FIG. 14 is shown, in accordance with examples of the technology disclosed herein. The crossbar switch controlled by TXCrossReg(n) 1820 operates on slots of data received (to a sink) either in downstream or in upstream.

As described above in connection with FIG. 16, the frame determined by host 1410 to arrive in downstream at port SN2.A 1451 will include data from SN0.G0.Ch0 1434*a* in Slot 0 1810, SN0.G0.Ch1 1434*b* in Slot 1 1811, SN1.G0.Ch0 1443*a* in Slot 2 1812, and SN1.G0.Ch1 1443*b* in Slot 3 1813. SN2 1450 will copy this data without shifting slot position to TXFrameBuffer(n) 1830. TXCrossReg(n) 1820 will hold the address of incoming slots from TXFrameBuffer(n) 1830 for mapping the incoming data (from downstream or from upstream) to TXPinBuffer 1840 with slots corresponding to channels at SN2 1450. The TXPinBuffer will then map the slots to the intended channel pins.

To derive TXCrossReg(n) values for each group in DSSinkList(n), host 1410 computes the offset/index value with the stream list as follows, where k is the position of the $j^{th}$ group.

$$GroupOffsetWithinFrame(j) = \sum_{i=0}^{k-1} X_i \tag{1}$$

The host 1410 then calculates the total number of channels in the DSSinkList(n): group where $X_i$ is the number of channels in the $i^{th}$ stream and n is the total number of elements in DSSinkList(n).

$$TotDNCh = \sum_{i=0}^{N} X_i \tag{2}$$

The host 1410 then performs Eq. (1) and Eq. (2) for USSinkList(n), and loops through each group's channel and updates TXCrossReg(n) based on the offset in the following fashion, where $X_m$ is the number of channels in the mth group, M is the bit position in TXCrossReg(n), I is the channel number within the group.

$$GroupOffsetWithinPinBuffer(j) = \sum_{m=0}^{j-1} X_m \tag{3}$$

$$M = GroupOffsetWithinPinBuffer(j) + i \tag{4}$$

$$TXCross(M) = GroupOffsetWithinFrame(j) + i \tag{5}$$

Figure 19:
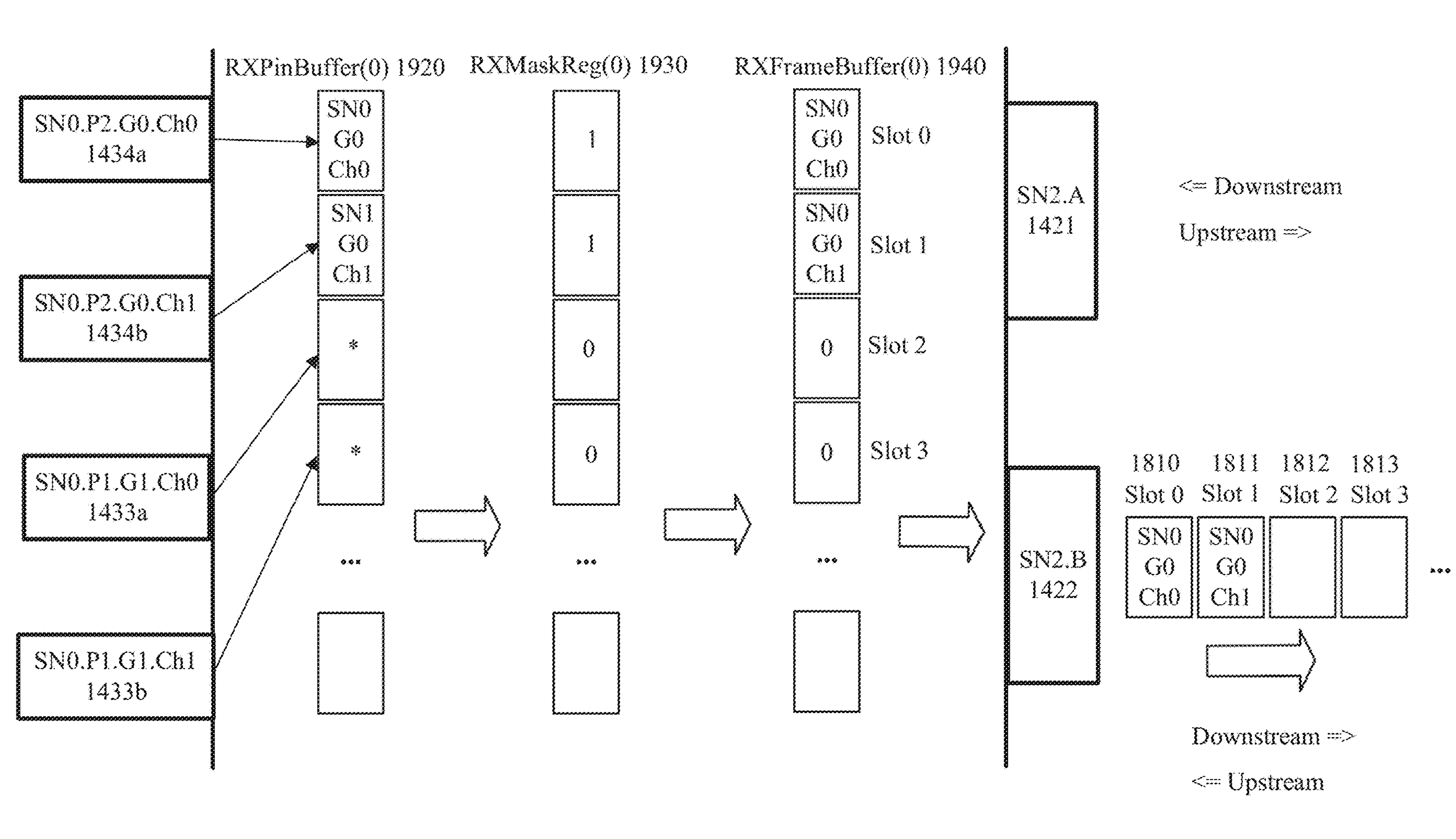
FIG. 19 illustrates a downstream flow of the data to a node for the example of FIG. 14, in accordance with examples of the technology disclosed herein.

Referring to FIG. 19 and continuing to refer to prior figures for context, a downstream flow 1900 of the data from SN0 1430 of the example of FIG. 14 is shown, in accordance with examples of the technology disclosed herein. As described above in connection with FIG. 16, the frame determined by host 1410 to be written to the A2B bus downstream at port SN0.B 1432 will include only data from SN0.G0.Ch0 1434*a* in Slot 0 1910 and data from SN0.G0.Ch1 1434*b* in Slot 1 1911. Slot 1812 and slot 1813 will remain empty at this point, since the audio stream source group populating those slots is downstream from SN0 1430.

From the left of FIG. 19, data from peripherals SN0.P1 1433 and SN0.P2 1434 can be received at SN0 1430 in an RXPinBuffer(0) 1920. Through the use of RXMaskReg(0) 1930, only certain slots of data will be read from RXPinBuffer(0) and written to RXFrameBuffer(0) 1940 for SN0 1430 to write to the A2B bus 1460.

To derive RXMaskReg(n) values for each group in SourceList(n) (a combination of DSSourceList(n) and USSourceList(n)) host 1410 computes the offset/index value with the stream list as follows, where $X_m$ is the number of channels in the $m^{th}$ group . . . .

$$GroupOffsetWithinPinBuffer(j) = \sum_{m=0}^{k-1} X_m \tag{1}$$

The host 1410 then loops through each group's channel and updates RXMaskReg(n) based on the offset in the following fashion, where $X_m$ is the number of channels in the mth group, M is the bit position in TXCrossReg(n), I is the channel number within the group.

$$GroupOffsetWithinPinBuffer(j) = \sum_{m=0}^{j-1} X_m \tag{3}$$

$$M = GroupOffsetWithinPinBuffer(j) + i \tag{4}$$

$$RXMaskReg(M) = 1, \text{ where } M \text{ is the bit position} \tag{5}$$

The host then writes, over the network to each corresponding register of each node n the derived register values—Block 1360. In the example of network 1400, host 1410 writes DNMaskReg(n), DNSlotReg(n), UPMaskReg (n), UPSlotReg(n), TXCrossReg(n), and RXMaskReg(n) to each node n.

In some examples, at each node n after the writing, node n receives a frame of the network in downstream and writes each slot of the frame passing DNMaskReg(n) to a sink audio group frame buffer. Node n writes each slot of the sink audio group frame buffer to a sink audio group pin buffer according to TXCrossReg(n). In operation, at each node n after the writing, node n receives channel audio data from a peripheral into a source audio group buffer and writes the received channel audio data to a source audio frame buffer according to RXMaskReg(n).

In some examples, after the writing, node n receives a frame of the network in upstream on the A2B bus and writes, to a sink audio group frame buffer, each slot of the received frame passing UPMaskReg(n). The node then writes, to a sink audio group pin buffer, each slot of the sink audio group frame according to TXCrossReg(n).

In some examples, after the writing, node n receives, from a peripheral, channel audio data into a source audio group pin buffer. Node n then writes, from the source audio group pin buffer, the received channel audio data to a source audio frame buffer according to RXMaskReg(n). Next, node n transmits, in upstream on the bus in a frame of the network, the received channel audio data written to the source audio frame buffer and passing the UPSlotReg(n).

In some examples, writing includes writing from the host to corresponding register of each node n using one of Serial Peripheral Interface (SPI), an Inter-Integrated Circuit (I2C) interface, an Inter-Integrated Sound (I2S)/Time Division Multiplex (TDM) interface, and any combination thereof.

In some examples, methods such as method 1300 further include the host 1410 discovering a change in one or more of network topology, audio groups, audio channels, and identification of audio streams. In such examples, the host 1410 performing the first deriving, second deriving, third deriving, and writing in accordance with the discovered change.

In some examples, receiving identification of at least one audio stream includes receiving user selection of matrix elements via a graphical user interface (GUI), the matrix characterized by each column representing one source audio group and each row representing one sink audio group.

Figure 20:
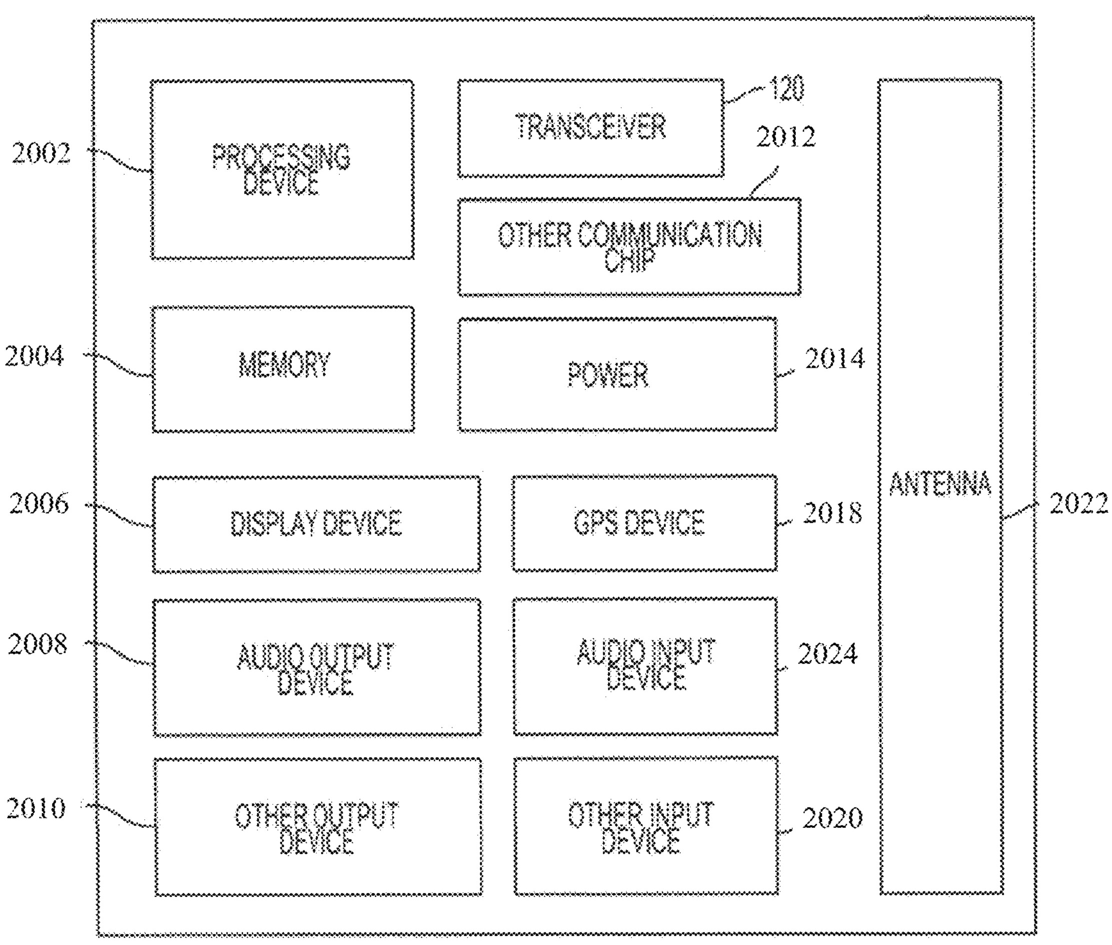
FIG. 20 schematically illustrates a device that may serve as a host or a node (e.g., a host, a main node, or a sub node) in the system, in accordance with various examples.

Examples of the present disclosure may be implemented into a system using any suitable hardware and/or software to configure as desired. Referring to FIG. 20, and continuing to refer to prior figures for context, FIG. 20 schematically illustrates a device 2000 that may serve as a host or a node (e.g., a host 110, a main node 102-1, or a sub node 102-2) in the system 100, in accordance with various examples. A number of components are illustrated in FIG. 20 as included in the device 2000, but any one or more of these components may be omitted or duplicated, as suitable for the application.

Additionally, in various examples, the device 2000 may not include one or more of the components illustrated in FIG. 20, but the device 2000 may include interface circuitry for coupling to the one or more components. For example, the device 2000 may not include a display device 2006, but may include display device interface circuitry (e.g., a connector and driver circuitry) to which a display device 2006 may be coupled. In another set of examples, the device 2000 may not include an audio input device 2024 or an audio output device 2008, but may include audio input or output device interface circuitry (e.g., connectors and supporting circuitry) to which an audio input device 2024 or audio output device 2008 may be coupled.

The device 2000 may include the node transceiver 120, in accordance with any of the examples disclosed herein, for managing communication along the bus 106 when the device 2000 is coupled to the bus 106. The device 2000 may include a processing device 2002 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 2002 may include one or more DSPs, ASICs, central processing units (CPUs), graphics processing units (GPUs), cryptoprocessors, or any other suitable processing devices. The device 2000 may include a memory 2004, which may itself include one or more memory devices such as volatile memory (e.g., dynamic random-access memory (DRAM)), non-volatile memory (e.g., read-only memory (ROM)), flash memory, solid state memory, and/or a hard drive.

In some examples, the memory 2004 may be employed to store a working copy and a permanent copy of programming instructions to cause the device 2000 to perform any suitable ones of the techniques disclosed herein. In some examples, machine-accessible media (including non-transitory computer-readable storage media), methods, systems, and devices for performing the above-described techniques are illustrative examples disclosed herein for communication over a two-wire bus. For example, a computer-readable media (e.g., the memory 2004) may have stored thereon instructions that, when executed by one or more of the processing devices included in the processing device 2002, cause the device 2000 to perform any of the techniques disclosed herein.

In some examples, the device 2000 may include another communication chip 2012 (e.g., one or more other communication chips). For example, the communication chip 2012 may be configured for managing wireless communications for the transfer of data to and from the device 2000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some examples they might not.

The communication chip 2012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 2012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 2012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other examples. The device 2000 may include an antenna 2022 to facilitate wireless communications and/or to receive other wireless communications (such as AM or FM radio transmissions).

In some examples, the communication chip 2012 may manage wired communications using a protocol other than the protocol for the bus 106 described herein. Wired communications may include electrical, optical, or any other suitable communication protocols. Examples of wired communication protocols that may be enabled by the communication chip 2012 include Ethernet, controller area network (CAN), I2C, media-oriented systems transport (MOST), or any other suitable wired communication protocol.

As noted above, the communication chip 2012 may include multiple communication chips. For instance, a first communication chip 2012 may be dedicated to shorter-range wireless communications such as Wi-Fi or Bluetooth, and a second communication chip 2012 may be dedicated to longer-range wireless communications such as global positioning system (GPS), EDGE, GPRS, CDMA, WiMAX, LTE, EV-DO, or others. In some examples, a first communication chip 2012 may be dedicated to wireless communications, and a second communication chip 2012 may be dedicated to wired communications.

The device 2000 may include battery/power circuitry 2014. The battery/power circuitry 2014 may include one or more energy storage devices (e.g., batteries or capacitors) and/or circuitry for coupling components of the device 2000 to an energy source separate from the device 2000 (e.g., AC line power, voltage provided by a car battery, etc.). For example, the battery/power circuitry 2014 may include the upstream bus interface circuitry 132 and the downstream bus interface circuitry 131 discussed above with reference to FIG. 2 and could be charged by the bias on the bus 106.

The device 2000 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The device 2000 may include an audio output device 2008 (or corresponding interface circuitry, as discussed above). The audio output device 2008 may include any device that generates an audible indicator, such as speakers, headsets, or earbuds, for example.

The device 2000 may include an audio input device 2024 (or corresponding interface circuitry, as discussed above). The audio input device 2024 may include any device that generates a signal representative of a sound, such as microphones, microphone arrays, or digital instruments (e.g., instruments having a musical instrument digital interface (MIDI) output).

The device 2000 may include a GPS device 2018 (or corresponding interface circuitry, as discussed above). The GPS device 2018 may be in communication with a satellite-based system and may receive a location of the device 2000, as known in the art.

The device 2000 may include another output device 2010 (or corresponding interface circuitry, as discussed above). Examples of the other output device 2010 may include an audio codec, a video codec, a printer, a wired or wireless transmitter for providing information to other devices, or an additional storage device. Additionally, any suitable ones of the peripheral devices 108 discussed herein may be included in the other output device 2010.

The device 2000 may include another input device 2020 (or corresponding interface circuitry, as discussed above). Examples of the other input device 2020 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 2020.

Any suitable ones of the display, input, output, communication, or memory devices described above with reference to the device 2000 may serve as the peripheral device 108 in the system 100. Alternatively or additionally, suitable ones of the display, input, output, communication, or memory devices described above with reference to the device 2000 may be included in a host (e.g., the host 110) or a node (e.g., a main node 102-1 or a sub node 102-2).

The elements of a system 100 may be chosen and configured to provide audio and/or light control over the bus 106. In some examples, the system 100 may be configured to serve as a light control system in a vehicle or other environment, with lighting devices (e.g., strip-line light-emitting diodes (LEDs) or other LED arrangements) serving as peripheral devices 108 in communication with nodes 102 along the bus 106; data may be communicated over the bus 106 to control the color, intensity, duty cycle, and/or or other parameters of the lighting devices. In some examples, the system 100 may be configured to serve as an audio control system in a vehicle or other environment, with a microphone or other device including an accelerometer that may serve as a peripheral device 108 in communication with a node 102 along the bus 106; data from the accelerometer may be communicated over the bus 106 to control other peripheral devices 108 along the bus 106. For example, large spikes in the acceleration data or other predetermined acceleration data patterns may be used to trigger the generation of a sound effect, such as a cowbell or drum hit, by a processing device coupled to a node 102; that sound effect may be output by a speaker coupled to the processing device and/or by a speaker coupled to another node 102 along the bus 106. Some examples of the system 100 may combine any of the lighting control and/or audio control techniques disclosed herein.

Although various ones of the examples discussed above describe the system 100 in a vehicle setting, this is simply illustrative, and the system 100 may be implemented in any desired setting. For example, in some examples, a "suitcase" implementation of the system 100 may include a portable housing that includes the desired components of the system 100; such an implementation may be particularly suitable for portable applications, such as portable karaoke or entertainment systems.

Having thus described several aspects and examples of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the examples described herein.

Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, inventive examples may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more examples of the subject matter disclosed herein. These examples are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the examples introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described examples may be implemented in any of numerous ways. One or more aspects and examples of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various examples described above.

The computer readable medium or media may be transportable, such that the program or programs stored thereon may be loaded onto one or more different computers or other processors to implement various ones of the aspects described above. In some examples, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some examples, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other examples, these elements may include any suitable algorithms, hardware, software, components, modules, interfaces, or objects that facilitate the operations thereof.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various examples, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various examples.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, a computer-implemented method wit memory storing code/instructions therein, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some examples, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, examples may be constructed in which acts are performed in an order different than illustrated, which may include performing some acts simultaneously, even though shown as sequential acts in illustrative examples.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims: "comprise," "comprising," and the like are to be construed in an inclusive sense, as opposed to an exclusive or exhaustive sense; that is to say, in the sense of "including, but not limited to." "Connected," "coupled," or any variant thereof, means any connection or coupling, either direct or indirect, between two or more elements. The coupling or connection between the elements can be physical, logical, or a combination thereof. "Herein," "above," "below," and words of similar import, when used to describe this specification shall refer to this specification as a whole and not to any particular portions of this specification. "Or," in reference to a list of two or more items, covers all of the following interpretations of the word: any of the items in the list, all of the items in the list, and any combination of the items in the list. The singular forms "a," "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one example, to A only (optionally including elements other than B); in another example, to B only (optionally including elements other than A); in yet another example, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular examples described above. Various modifications, equivalent processes, as well as numerous structures to which the present invention may be applicable, will be readily apparent to those skilled in the art to which the present invention is directed upon review of the present disclosure.

It should be understood that the detailed description and specific examples, while indicating examples of the systems and methods are intended for purposes of illustration only and are not intended to limit the scope. These and other features, aspects, and advantages of the systems and methods of the present invention can be better understood from the description, appended claims or aspects, and accompanying drawings. It should be understood that the Figures are merely illustrative and are not drawn to scale. It should also be understood that the same reference numerals are used throughout the figures to indicate the same or similar parts.

Other variations to the disclosed examples can be understood and effected by those skilled in the art in practicing the disclosure, from a study of the drawings, the disclosure, and the appended aspects or claims. In the aspects or claims, the word “comprising” does not exclude other elements or steps, and the indefinite article “a” or “an” does not exclude a plurality. The mere fact that certain measures are recited in mutually different dependent aspects or claims does not indicate that a combination of these measures cannot be used to advantage. Any reference signs in the claims should not be construed as limited the scope.

What is claimed is:

1. A computer-implemented method for configuring a network, comprising:

in a network comprising a host, a main node in communication with the host, an ordered daisy chain of sub nodes in communication with the main node via a bus, and at least one peripheral in communication with each sub node other than via the bus, the bus implementing a frame and slot time division multiplexing networking protocol, the method comprising:

discovering, by the host, each node and each audio group at each node, wherein an audio group comprises one or more audio channels and is characterized as one of a source audio group or a sink audio group;

receiving, by the host, identification of at least one audio stream characterized by a source audio group and at least one sink audio group;

first deriving, by the host and for each node n starting from the main node and proceeding downstream to a last node: register values DNMaskReg(n) identifying slots associated with each audio stream having a source audio group upstream of node n and a sink audio group at node n, and register values DNSlotReg(n) identifying slots associated with each audio stream having a source audio group upstream of node n;

second deriving, after the first deriving, by the host, and for each node n starting from the last node and proceeding upstream to the main node: register values UPMaskReg(n) identifying slots associated with each audio stream having a source audio group downstream of node n and a sink audio group at node n, and register values UPSlotReg(n) identifying slots associated with each audio stream having a source audio group downstream of node n and at least one sink audio group upstream of node n;

third deriving, by the host for each node n: register values TXCrossReg(n) mapping each slot passing DNMaskReg(n) or UPMaskReg(n) to a channel of a sink audio group at node n, register values RXMaskReg(n) mapping each channel of a source audio group at node n to slots passing DNSlotReg(n) or UPSlotReg(n); and first writing, by the host and over the network to a corresponding register of each node n, the derived register values.

2. The method of claim 1, further comprising, at each node n, after the first writing:

receiving, in downstream on the bus, a frame of the network;

writing, to a sink audio group frame buffer, each slot of the received frame passing DNMaskReg(n); and writing, to a sink audio group pin buffer, each slot of the sink audio group frame according to TXCrossReg(n).

3. The method of claim 1, further comprising, at each node n, after the first writing:

receiving, from a peripheral, channel audio data into a source audio group pin buffer;

writing, from the source audio group pin buffer, the received channel audio data to a source audio frame buffer according to RXMaskReg(n); and transmitting, in downstream on the bus in a frame of the network, the received channel audio data written to the source audio frame buffer and passing the DNSlotReg (n).

4. The method of claim 1, further comprising, at each node n, after the first writing:

receiving, in upstream on the bus, a frame of the network;

writing, to a sink audio group frame buffer, each slot of the received frame passing UPMaskReg(n); and writing, to a sink audio group pin buffer, each slot of the sink audio group frame according to TXCrossReg(n).

5. The method of claim 1, further comprising, at each node n, after the first writing:

receiving, from a peripheral, channel audio data into a source audio group pin buffer;

writing, from the source audio group pin buffer, the received channel audio data to a source audio frame buffer according to RXMaskReg(n); and transmitting, in upstream on the bus in a frame of the network, the received channel audio data written to the source audio frame buffer and passing the UPSlotReg (n).

6. The method of claim 1, wherein:

first writing comprises writing from the host to corresponding register of each node n using one of Serial Peripheral Interface (SPI), an Inter-Integrated Circuit (I2C) interface, an Inter-Integrated Sound (I2S)/Time Division Multiplex (TDM) interface, and any combination thereof.

7. The method of claim 1, further comprising:

discovering a change in one or more of network topology, audio groups, audio channels, and identification of audio streams; and performing the first deriving, second deriving, third deriving, and writing in accordance with the discovered change.

8. The method of claim 1, wherein:

receiving identification of at least one audio stream comprises receiving user selection of matrix elements via a graphical user interface (GUI), the matrix characterized by each column representing one source audio group and each row representing one sink audio group.

9. A system comprising:

a memory storing instructions therein; and one or more processors communicatively coupled with the memory, the one or more processors being configured to execute the instructions to, in a network comprising a host, a main node in communication with the host, an ordered daisy chain of sub nodes in communication with the main node via a bus, and at least one peripheral in communication with each sub node other than via the bus, the bus implementing a frame and slot time division multiplexing networking protocol:

discover, by the host, each node and each audio group at each node, wherein an audio group comprises one or more audio channels and is characterized as one of a source audio group or a sink audio group;

receive, by the host, identification of at least one audio stream characterized by a source audio group and at least one sink audio group;

first derive, by the host and for each node n starting from the main node and proceeding downstream to a last node: register values DNMaskReg(n) identifying slots associated with each audio stream having a source audio group upstream of node n and a sink audio group at node n, and register values DNSlotReg(n) identifying slots associated with each audio stream having a source audio group upstream of node n;

second derive, after the first deriving, by the host, and for each node n starting from the last node and proceeding upstream to the main node: register values UPMaskReg(n) identifying slots associated with each audio stream having a source audio group downstream of node n and a sink audio group at node n, and register values UPSlotReg(n) identifying slots associated with each audio stream having a source audio group downstream of node n and at least one sink audio group upstream of node n;

third derive, by the host for each node n: register values TXCrossReg(n) mapping each slot passing DNMaskReg(n) or UPMaskReg(n) to a channel of a sink audio group at node n, register values RXMaskReg(n) mapping each channel of a source audio group at node n to slots passing DNSlotReg(n) or UPSlotReg(n); and first write, by the host and over the network to a corresponding register of each node n, the derived register values.

10. The system of claim 9, wherein the one or more processors are further configured to execute the instructions to, at each node n, after the first writing:

receive, in downstream on the bus, a frame of the network;

write, to a sink audio group frame buffer, each slot of the received frame passing DNMaskReg(n); and write, to a sink audio group pin buffer, each slot of the sink audio group frame according to TXCrossReg(n).

11. The system of claim 9, wherein the one or more processors are further configured to execute the instructions to, at each node n, after the first writing:

receive, from a peripheral, channel audio data into a source audio group pin buffer;

write, from the source audio group pin buffer, the received channel audio data to a source audio frame buffer according to RXMaskReg(n); and transmit, in downstream on the bus in a frame of the network, the received channel audio data written to the source audio frame buffer and passing the DNSlotReg (n).

12. The system of claim 9, wherein the one or more processors are further configured to execute the instructions to, at each node n, after the first writing:

receive, in upstream on the bus, a frame of the network;

write, to a sink audio group frame buffer, each slot of the received frame passing UPMaskReg(n); and write, to a sink audio group pin buffer, each slot of the sink audio group frame according to TXCrossReg(n).

13. The system of claim 9, wherein the one or more processors are further configured to execute the instructions to, at each node n, after the first writing:

receiving, from a peripheral, channel audio data into a source audio group pin buffer;

writing, from the source audio group pin buffer, the received channel audio data to a source audio frame buffer according to RXMaskReg(n); and transmitting, in upstream on the bus in a frame of the network, the received channel audio data written to the source audio frame buffer and passing the UPSlotReg (n).

14. The system of claim 9, wherein:

first writing comprises writing from the host to corresponding register of each node n using one of Serial Peripheral Interface (SPI), an Inter-Integrated Circuit (I2C) interface, an Inter-Integrated Sound (I2S)/Time Division Multiplex (TDM) interface, and any combination thereof.

15. The system of claim 9, wherein the one or more processors are further configured to execute the instructions to, at each node n, after the first writing:

discover a change in one or more of network topology, audio groups, audio channels, and identification of audio streams; and perform the first deriving, second deriving, third deriving, and writing in accordance with the discovered change.

16. The system of claim 9, wherein:

receiving identification of at least one audio stream comprises receiving user selection of matrix elements via a graphical user interface (GUI), the matrix characterized by each column representing one source audio group and each row representing one sink audio group.

17. A non-transitory computer-readable medium storing computer executable instructions, the instructions when executed by one or more processors in a network comprising a host, a main node in communication with the host, an ordered daisy chain of sub nodes in communication with the main node via a bus, and at least one peripheral in communication with each sub node other than via the bus, the bus implementing a frame and slot time division multiplexing networking protocol, is operative to:

discover, by the host, each node and each audio group at each node, wherein an audio group comprises one or more audio channels and is characterized as one of a source audio group or a sink audio group;

receive, by the host, identification of at least one audio stream characterized by a source audio group and at least one sink audio group;

first derive, by the host and for each node n starting from the main node and proceeding downstream to a last node: register values DNMaskReg(n) identifying slots associated with each audio stream having a source audio group upstream of node n and a sink audio group at node n, and register values DNSlotReg(n) identifying slots associated with each audio stream having a source audio group upstream of node n;

second derive, after the first deriving, by the host, and for each node n starting from the last node and proceeding upstream to the main node: register values UPMaskReg (n) identifying slots associated with each audio stream having a source audio group downstream of node n and a sink audio group at node n, and register values UPSlotReg(n) identifying slots associated with each audio stream having a source audio group downstream of node n and at least one sink audio group upstream of node n;

third derive, by the host for each node n: register values TXCrossReg(n) mapping each slot passing DNMaskReg(n) or UPMaskReg(n) to a channel of a sink audio group at node n, register values RXMaskReg(n) mapping each channel of a source audio group at node n to slots passing DNSlotReg(n) or UPSlotReg(n); and first write, by the host and over the network to a corresponding register of each node n, the derived register values.

18. The computer-readable medium of claim 17, wherein the one or more processors are further configured to execute the instructions to, at each node n, after the first writing:

receive, in downstream on the bus, a frame of the network;

write, to a sink audio group frame buffer, each slot of the received frame passing DNMaskReg(n); and write, to a sink audio group pin buffer, each slot of the sink audio group frame according to TXCrossReg(n).

19. The computer-readable medium of claim 17, wherein the one or more processors are further configured to execute the instructions to, at each node n, after the first writing:

receive, from a peripheral, channel audio data into a source audio group pin buffer;

write, from the source audio group pin buffer, the received channel audio data to a source audio frame buffer according to RXMaskReg(n); and transmit, in downstream on the bus in a frame of the network, the received channel audio data written to the source audio frame buffer and passing the DNSlotReg (n).

20. The computer-readable medium of claim 17, wherein the one or more processors are further configured to execute the instructions to, at each node n, after the first writing:

receive, in upstream on the bus, a frame of the network;

write, to a sink audio group frame buffer, each slot of the received frame passing UPMaskReg(n); and write, to a sink audio group pin buffer, each slot of the sink audio group frame according to TXCrossReg(n).

21. The computer-readable medium of claim 17, wherein the one or more processors are further configured to execute the instructions to, at each node n, after the first writing:

receiving, from a peripheral, channel audio data into a source audio group pin buffer;

writing, from the source audio group pin buffer, the received channel audio data to a source audio frame buffer according to RXMaskReg(n); and transmitting, in upstream on the bus in a frame of the network, the received channel audio data written to the source audio frame buffer and passing the UPSlotReg (n).

22. The computer-readable medium of claim 17, wherein:

first writing comprises writing from the host to corresponding register of each node n using one of Serial Peripheral Interface (SPI), an Inter-Integrated Circuit (I2C) interface, an Inter-Integrated Sound (I2S)/Time Division Multiplex (TDM) interface, and any combination thereof.

23. The computer-readable medium of claim 17, wherein the one or more processors are further configured to execute the instructions to, at each node n, after the first writing:

discover a change in one or more of network topology, audio groups, audio channels, and identification of audio streams; and perform the first deriving, second deriving, third deriving, and writing in accordance with the discovered change.

24. The computer-readable medium of claim 17, wherein:

receiving identification of at least one audio stream comprises receiving user selection of matrix elements via a graphical user interface (GUI), the matrix characterized by each column representing one source audio group and each row representing one sink audio group.

* * * * *